US012808693B2

(12) United States Patent
Egawa et al.

(10) Patent No.: US 12,808,693 B2
(45) Date of Patent: Nov. 24, 2026

(54) MAGNETIC SENSOR AND MAGNETIC SENSOR DEVICE

(71) Applicant: Hirose Electric Co., Ltd., Yokohama (JP)

(72) Inventors: Kosuke Egawa, Yokohama (JP); Kota Aizawa, Yokohama (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 161 days.

(21) Appl. No.: 18/825,708

(22) Filed: Sep. 5, 2024

(65) Prior Publication Data

US 2025/0102328 A1 Mar. 27, 2025

(30) Foreign Application Priority Data

Sep. 25, 2023 (JP) ................................ 2023-159429

(51) Int. Cl.

| | |
|---|---|
| ***G01D 5/245*** | (2006.01) |
| ***H01F 3/06*** | (2006.01) |
| ***H01F 5/02*** | (2006.01) |

(52) U.S. Cl.

CPC ............... *G01D 5/245* (2013.01); *H01F 3/06* (2013.01); *H01F 5/02* (2013.01)

(58) Field of Classification Search

None

See application file for complete search history.

(56) References Cited

U.S. PATENT DOCUMENTS

| | | | | |
|---|---|---|---|---|
| 2019/0148043 | A1* | 5/2019 | Theil | H01F 27/2823 336/222 |
| 2022/0099462 | A1* | 3/2022 | Egawa | G01D 5/20 |
| 2022/0236045 | A1* | 7/2022 | Egawa | G01D 5/20 |
| 2022/0333959 | A1* | 10/2022 | Loeken | G01D 5/145 |
| 2025/0155523 | A1* | 5/2025 | Houda | G01D 5/245 |

FOREIGN PATENT DOCUMENTS

| | | |
|---|---|---|
| WO | 2016021074 A1 | 2/2016 |

* cited by examiner

*Primary Examiner* — Jas A Sanghera

(74) *Attorney, Agent, or Firm* — Procopio, Cory, Hargreaves & Savitch LLP

(57) ABSTRACT

The magnetic sensor comprises a magnetic wire rod that generates a large Barkhausen effect, a coil, and a bobbin; the bobbin has a wire winding portion in whose interior the magnetic wire rod is disposed and on whose outer peripheral portion the coil is provided, and a pair of columnar support portions respectively provided in the sections at opposite ends of the wire winding portion; the pair of columnar support portions protrude downwardly from the respective sections at opposite ends of the wire winding portion; and the amount of protrusion thereof is configured such that, once the magnetic sensor is mounted to the substrate, a component placement space allowing for placement of components is formed between the section on the outer peripheral surface of the coil facing the component-carrying surface and the component-carrying surface itself.

20 Claims, 19 Drawing Sheets

MAGNETIC SENSOR AND MAGNETIC SENSOR DEVICE

CROSS-REFERENCE TO RELATED APPLICATIONS

This application claims priority to Japanese Patent Application No. 2023-159429, filed Sep. 25, 2023, the contents of which are incorporated herein by reference in its entirety for all purposes.

BACKGROUND

Field

The present invention relates to a magnetic sensor and a magnetic sensor device that utilize a large Barkhausen effect.

Background Art

A magnetic sensor that utilizes a large Barkhausen effect comprises a magnetic wire rod that generates a large Barkhausen effect, a coil, and a bobbin. The magnetic wire rod is provided in the interior of the bobbin, and the coil, formed by winding an electrical wire on the bobbin, is provided on the outer periphery of the magnetic wire rod.

The magnetic wire rod that generates a large Barkhausen effect possesses uniaxial anisotropy in which the direction of easy magnetization is the axial direction of said magnetic wire rod. In addition, the magnetic wire rod has a property whereby the direction of magnetization of said magnetic wire rod is abruptly reversed in response to changes in the direction of an external magnetic field. The abrupt reversals of the direction of magnetization of the magnetic wire rod generate a current pulse in the coil. This electric current can be extracted as sensed pulses, and changes in the direction of the external magnetic field can be sensed based on these sensed pulses.

A magnetic sensor that utilizes a large Barkhausen effect can be used as a sensing element that senses the rotation of a rotating body. An example thereof has been described in International Publication No. 2016/021074. When sensing the rotation of a rotating body with the help of a magnetic sensor that utilizes a large Barkhausen effect, methods involving securing magnets to the rotating body and the like are used to adapt the magnets and the rotating body for rotation as a single unit. Thus, once the rotating body is rotated, a rotating magnetic field is formed around the rotating body. In addition, multiple magnetic sensors are provided on a substrate and the substrate is provided on the outer periphery of the rotating body in a manner free of contact with the rotating body and the magnets. The multiple magnetic sensors are disposed in proximity to the rotational trajectory of the magnets in respectively different positions in the direction of rotation of the magnets. Thus, once the rotating body is rotated, the multiple magnetic sensors are placed within a rotating magnetic field. As a result, the direction of the external magnetic field acting on the respective magnetic sensors changes in response to the rotation of the rotating body, due to which sensed pulses are obtained from the coils of the respective magnetic sensors. In addition, the fact that multiple magnetic sensors are disposed in respectively different positions in the direction of rotation of the magnets makes it possible to vary the timing of when the direction of the external magnetic field changes in the respective magnetic sensors in response to the rotation of the rotating body and, for this reason, makes it possible to vary the timing of when the sensed pulses are obtained from the coils of the respective magnetic sensors in response to the rotation of the rotating body. Thus, the amount of rotation, rotation angle, rotation frequency, direction of rotation, etc., of the rotating body can be sensed based on the sensed pulses obtained from the coils of the respective magnetic sensors.

PATENT DOCUMENTS

Patent Document 1

International Publication No. 2016/021074.

SUMMARY

Problems to be Solved

It is an object of the present disclosure to increase the area in which components other than a magnetic sensor or magnetic sensor device that utilizes a large Barkhausen effect are disposed on a component-carrying surface of a substrate on which the magnetic sensor or magnetic sensor device is disposed.

For example, when the rotation of a rotating body is sensed with the help of a magnetic sensor that utilizes a large Barkhausen effect, the magnetic sensor that utilizes a large Barkhausen effect is mounted to a substrate. Multiple electrical and electronic components, etc., are often mounted to the substrate in addition to said magnetic sensor. A variety of components such as resistors, capacitors, diodes, transistors, integrated circuits, and the like, are the types of electrical and electronic components, etc., mounted to the substrate.

In the construction of a magnetic sensor that utilizes a large Barkhausen effect, the coil is provided on the outer periphery of the magnetic wire rod that generates a large Barkhausen effect, which makes size reduction to the millimeter range difficult. For this reason, in the event that a magnetic sensor that utilizes a large Barkhausen effect is disposed on a component-carrying surface of a substrate, the proportion of the area occupied by said magnetic sensor on the component-carrying surface of the substrate increases, and there is a risk that the area where electrical and electronic components, etc., other than said magnetic sensor are disposed on the component-carrying surface of the substrate may be insufficient.

The present invention has been devised by taking problems such as those described above into consideration, and it is an object of the present invention to provide a magnetic sensor that utilizes a large Barkhausen effect, wherein said magnetic sensor is capable of increasing the area where components other than said magnetic sensor are disposed on a component-carrying surface of a substrate having said magnetic sensor disposed thereon, or a magnetic sensor device that utilizes a large Barkhausen effect, wherein said magnetic sensor device is capable of increasing the area where components other than said magnetic sensor device are disposed on a component-carrying surface of a substrate having said magnetic sensor device disposed thereon.

Technical Solution

In order to eliminate the problems described above, the inventive magnetic sensor is a magnetic sensor that utilizes a large Barkhausen effect, comprising: a magnetic wire rod that generates a large Barkhausen effect; a coil through which flows an electric current corresponding to changes in the direction of magnetization of the magnetic wire rod; and a bobbin having a wire winding portion in whose interior the magnetic wire rod is disposed and on whose outer peripheral portion an electrical wire forming the coil is wound, and a pair of columnar support portions respectively provided in the sections at opposite ends of the wire winding portion, wherein the pair of columnar support portions protrude from the respective sections at opposite ends of the wire winding portion in one direction, intersecting the axis of the wire winding portion; the end face on the protruding end of each columnar support portion is a surface that makes contact with a component-carrying surface once said magnetic sensor is mounted to a substrate; and the amount of protrusion of the pair of columnar support portions from the sections at opposite ends of the wire winding portion in the one direction is configured such that, once said magnetic sensor is mounted to the substrate, a component placement space allowing for placement of components other than said magnetic sensor that are contemplated to be disposed on the component-carrying surface is formed between the section facing the component-carrying surface on the outer peripheral surface of the coil and the component-carrying surface. With the use of the inventive magnetic sensor, components other than said magnetic sensor that are contemplated to be disposed on the component-carrying surface can be disposed in an area where a component placement space is formed on the component-carrying surface of the substrate having said magnetic sensor disposed thereon. In this manner, with the use of the inventive magnetic sensor, it is possible to increase the area where components other than said magnetic sensor are disposed on the component-carrying surface of the substrate having said magnetic sensor disposed thereon.

In addition, in the inventive magnetic sensor described above, the amount of protrusion of the pair of columnar support portions is preferably configured such that, once said magnetic sensor is mounted to the substrate, the distance between the section on the outer peripheral surface of the coil facing the component-carrying surface and the component-carrying surface itself exceeds the height dimension of the components. Furthermore, in the inventive magnetic sensor described above, the amount of protrusion of the pair of columnar support portions may be configured such that, once said magnetic sensor is mounted to the substrate, the distance between the section on the outer peripheral surface of the coil facing the component-carrying surface and the component-carrying surface itself becomes equal to or greater than a value obtained by adding an insulating distance to be ensured between the components and said magnetic sensor to the height dimension of the components.

In order to eliminate the problems described above, the inventive magnetic sensor device is a magnetic sensor device that utilizes a large Barkhausen effect, comprising: a magnetic sensor having a magnetic wire rod that generates a large Barkhausen effect, a coil through which flows an electric current corresponding to changes in the direction of magnetization of the magnetic wire rod, and a bobbin in whose interior the magnetic wire rod is disposed and on whose outer peripheral portion an electrical wire forming the coil is wound; and a sensor support member for supporting the magnetic sensor on a component-carrying surface of a substrate, wherein the sensor support member has a main body portion having a predetermined three-dimensional shape extending in a first direction; a sensor attachment portion provided in the main body portion and used to attach the magnetic sensor to the main body portion in an orientation in which the axis of the bobbin is parallel to a plane comprising the first direction; and multiple columnar support portions provided in the main body portion; each columnar support portion protrudes from the main body portion in a second direction intersecting the plane comprising the first direction; the end face on the protruding end of each columnar support portion is a surface that makes contact with the component-carrying surface once said magnetic sensor device is mounted to the substrate; and the amount of protrusion of each columnar support portion from the main body portion in the second direction is configured such that, once said magnetic sensor device is mounted to the substrate, a component placement space allowing for placement of components other than said magnetic sensor device that are contemplated to be disposed on the component-carrying surface is formed between the section on the outer peripheral surface of the coil facing the component-carrying surface of the magnetic sensor attached to the sensor attachment portion and the component-carrying surface itself. With the use of the inventive magnetic sensor device, components other than said magnetic sensor device that are contemplated to be disposed on the component-carrying surface can be disposed in an area where a component placement space is formed on the component-carrying surface of the substrate having said magnetic sensor device disposed thereon. In this manner, with the use of the inventive magnetic sensor device, it is possible to increase the area where components other than said magnetic sensor device are disposed on the component-carrying surface of the substrate having said magnetic sensor device disposed thereon.

In addition, in the inventive magnetic sensor device described above, the amount of protrusion of each columnar support portion is preferably configured such that, once said magnetic sensor device is mounted to the substrate, the distance between the section on the outer peripheral surface of the coil of the magnetic sensor attached to the sensor attachment portion which faces the component-carrying surface and the component-carrying surface itself exceeds the height dimension of the components. Furthermore, in the inventive magnetic sensor device described above, the amount of protrusion of each columnar support portion may be configured such that once said magnetic sensor device is mounted to the substrate, the distance between the section on the outer peripheral surface of the coil of the magnetic sensor attached to the sensor attachment portion which faces the component-carrying surface and the component-carrying surface itself becomes equal to or greater than a value obtained by adding an insulating distance to be ensured between the components and the magnetic sensor to the height dimension of the components.

In addition, in the inventive magnetic sensor device described above, the sensor support member may have securing portions for securing said sensor support member to the substrate using securing devices. Furthermore, in the inventive magnetic sensor device described above, a yoke that controls the direction of the magnetic flux of the magnetic field acting on the magnetic sensor may be provided in the main body portion. Moreover, the inventive magnetic sensor device described above may comprise multiple magnetic sensors, and the sensor support member may have multiple sensor attachment portions for respectively attaching each of the multiple magnetic sensors to the main body portion.

Technical Effect

With the use of the present invention, it is possible to provide a magnetic sensor that utilizes a large Barkhausen effect, wherein said magnetic sensor is capable of increasing the area where components other than said magnetic sensor are disposed on the component-carrying surface of the substrate having said magnetic sensor disposed thereon. In addition, with the use of the present invention, it is possible to provide a magnetic sensor device that utilizes a large Barkhausen effect, wherein said magnetic sensor device is capable of increasing the area where components other than said magnetic sensor device are disposed on the component-carrying surface of the substrate having said magnetic sensor device disposed thereon.

DETAILED DESCRIPTION

Magnetic Sensor Embodiment

An embodiment of the inventive magnetic sensor will now be described with reference to FIGS. 1-6. When referred to in the present embodiment, the directions "upward" (Ud), "downward" (Dd), "forward" (Fd), "backward" (Bd), "leftward" (Ld), and "rightward" (Rd) are in accordance with the arrows drawn at the bottom right of FIGS. 1-4. In addition, for ease of discussion, once the magnetic sensor is disposed on the component-carrying surface of the substrate, the direction away from the component-carrying surface is taken to be "upward," and the direction toward the component-carrying surface is taken to be "downward."

Figure 1:
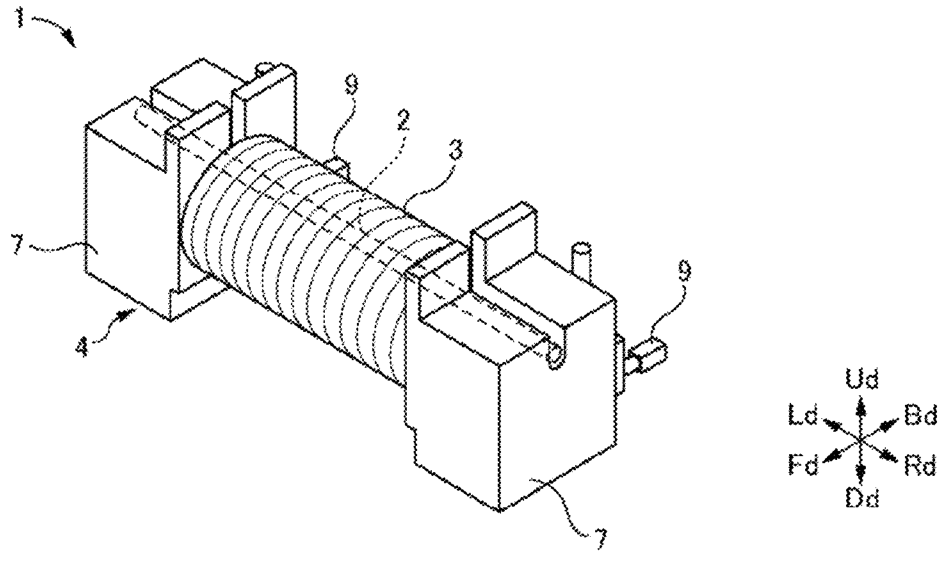
FIGS. 1 (A) to 1 (C) are perspective views illustrating an embodiment of the inventive magnetic sensor.
Figure 1:
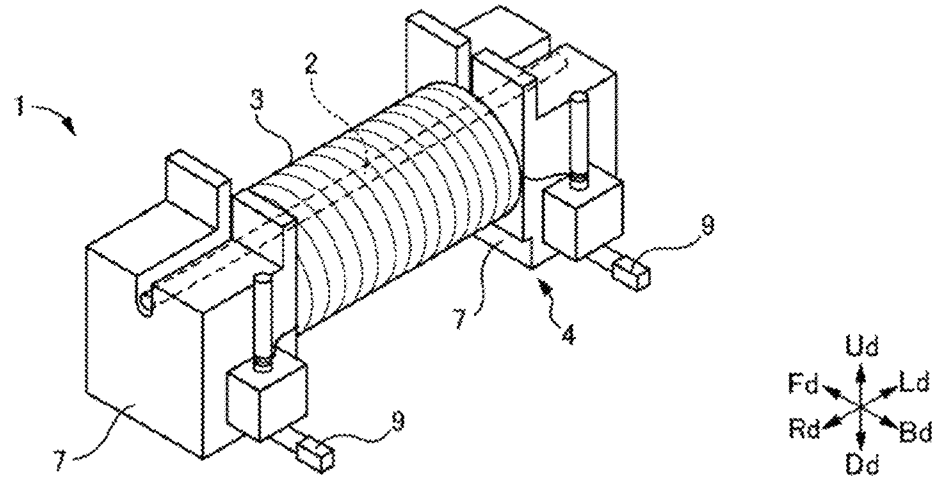
Figure 1:
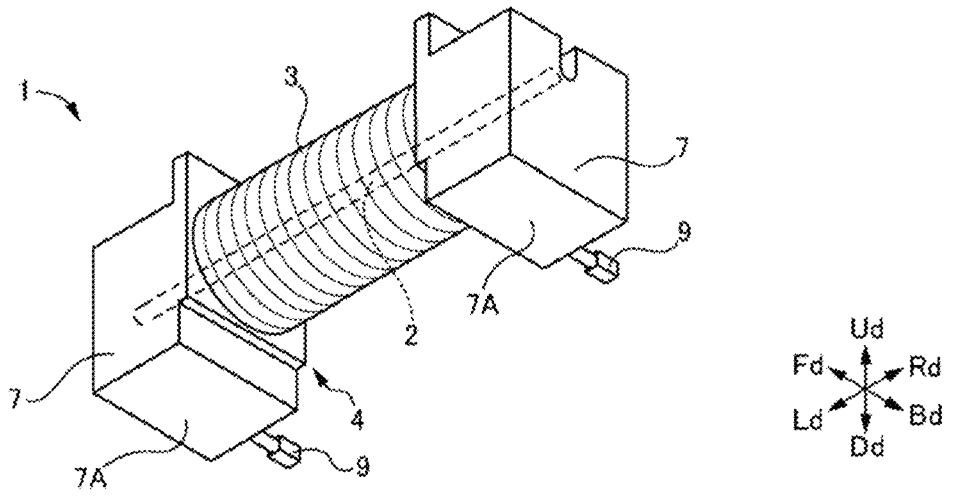
Figure 2:
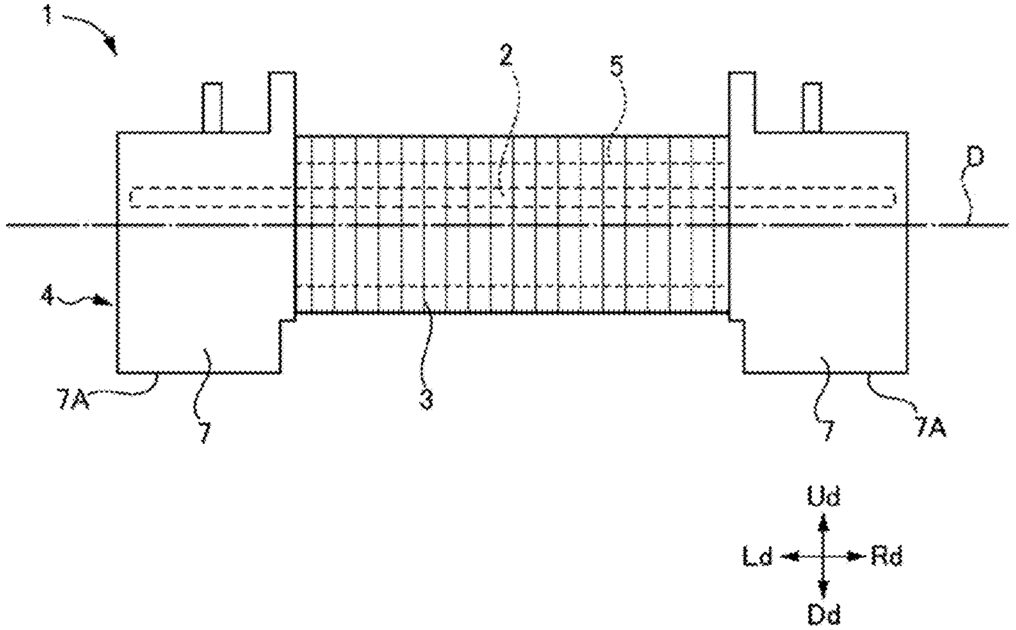
FIG. 2 is a front view of an embodiment of the inventive magnetic sensor.
Figure 3:
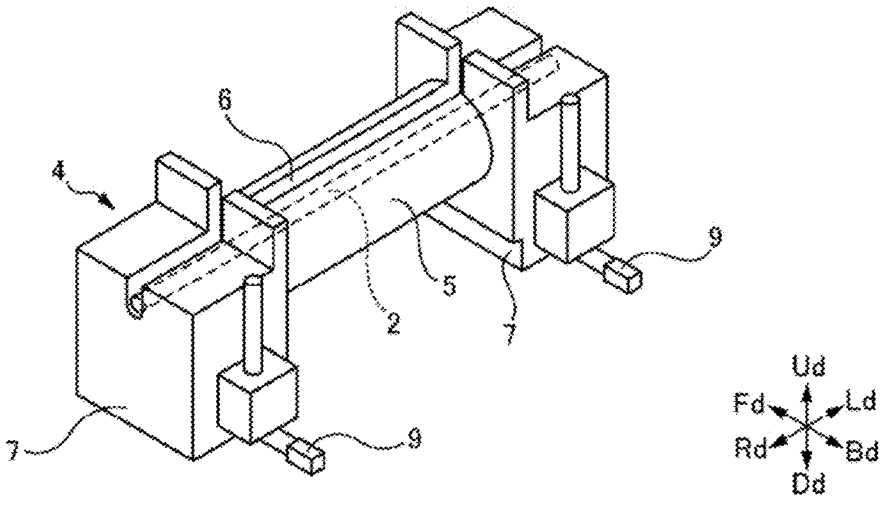
FIG. 3 is a perspective view of an embodiment of the inventive magnetic sensor, with the coil removed.
Figure 4:
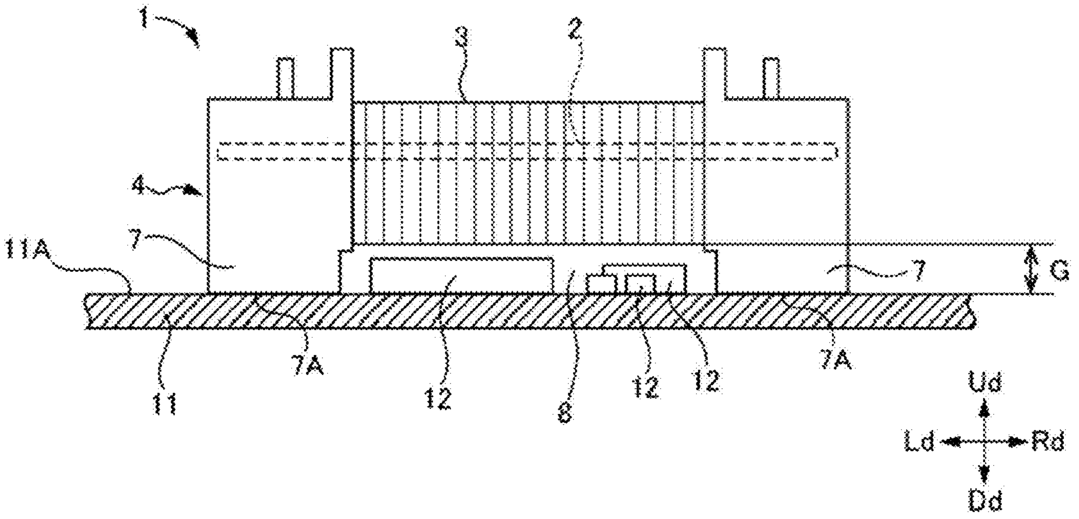
FIGS. 4 (A) and 4 (B) are illustrative views of an embodiment of the inventive magnetic sensor mounted to a substrate.
Figure 4:
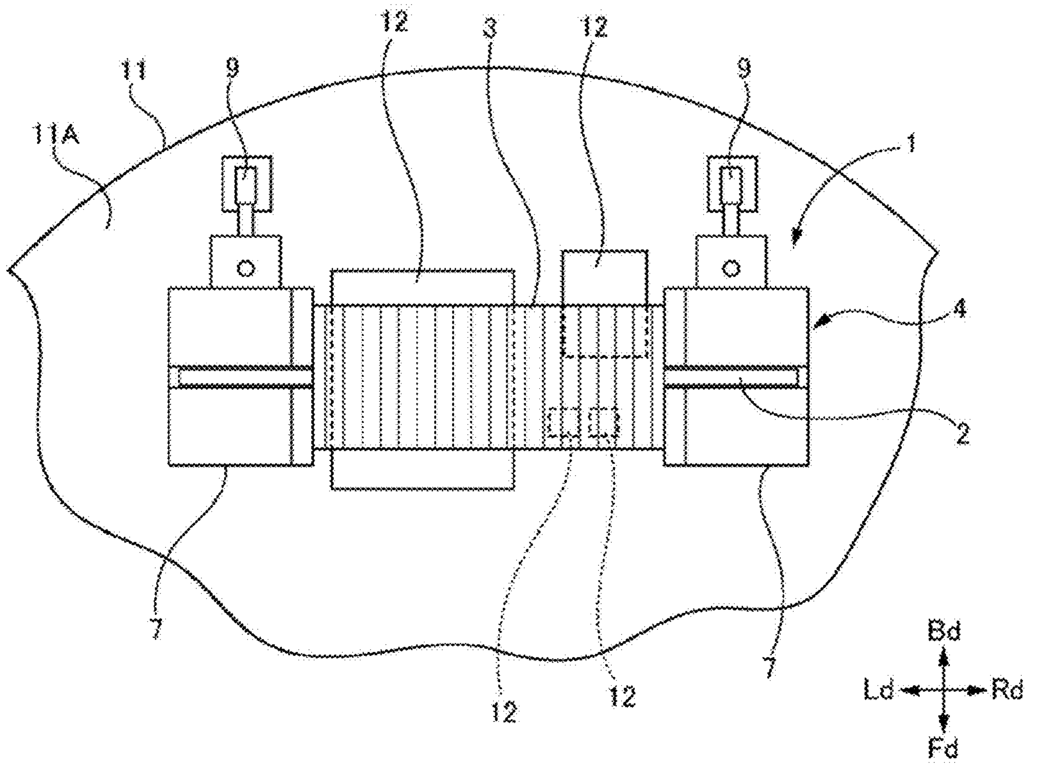

FIG. 1 (A) shows a front, top, right view of a magnetic sensor 1 representing an embodiment of the inventive magnetic sensor. FIG. 1 (B) shows a rear, top, right view of the magnetic sensor 1. FIG. 1 (C) shows a front, bottom, right view of the magnetic sensor 1. FIG. 2 shows a front view of the magnetic sensor 1. FIG. 3 shows the magnetic sensor 1 with the coil 3 removed. FIG. 4 (A) shows a front view of the magnetic sensor 1 mounted to the substrate 11. FIG. 4 (B) shows a top view of the magnetic sensor 1 mounted to the substrate 11.

The magnetic sensor 1 is a magnetic sensor that utilizes a large Barkhausen effect. As shown in FIG. 1 (A), the magnetic sensor 1 comprises a magnetic wire rod 2, a coil 3, a bobbin 4, and a pair of terminals 9.

The magnetic wire rod 2 is a magnetic wire rod that generates a large Barkhausen effect, and is called a composite magnetic wire. The magnetic wire rod 2 is a wire rod that is formed, e.g., from a semi-rigid magnetic material containing iron and cobalt, and has a diameter of, e.g., about 0.1 mm to 1 mm, and a length of, e.g., about 10 mm to 30 mm. The magnetic wire rod 2 is formed, for example, by drawing the above-mentioned semi-rigid magnetic material and twisting it multiple times while changing the direction. The magnetic wire rod 2 possesses uniaxial anisotropy in which the direction of easy magnetization is the direction of the central axis of said magnetic wire rod 2. In addition, in the magnetic wire rod 2, coercivity is higher in the central section than in the section on the outer periphery thereof. The magnetic wire rod 2 has a property whereby the direction of magnetization of the magnetic wire rod 2 (of the section on the outer periphery thereof) is abruptly reversed in response to changes in the direction of an external magnetic field.

The coil 3 is formed by winding an insulated electrical wire, such as an enameled wire or the like. The coil 3 is disposed on the outer periphery of the magnetic wire rod 2. Once the direction of the external magnetic field changes and the direction of magnetization of the magnetic wire rod 2 is accordingly abruptly reversed, a current pulse flows through the coil 3. Extracting this electric current as sensed pulses allows for changes in the direction of the external magnetic field to be sensed based on these sensed pulses.

The bobbin 4 is formed, for example, from plastic or other nonmagnetic material. As shown in FIG. 3, the bobbin 4 comprises a wire winding portion 5 and a pair of columnar support portions 7.

The wire winding portion 5 is formed in a cylindrical configuration extending in the left-to-right direction. The axis D of the wire winding portion 5 extends in the left-to-right direction (see FIG. 2). The magnetic wire rod 2 is disposed in the interior of the wire winding portion 5. Specifically, a groove 6 extending in the left-to-right direction is formed in the wire winding portion 5, and the magnetic wire rod 2 is disposed within this groove 6. The magnetic wire rod 2 is disposed such that the axis thereof extends in the left-to-right direction parallel to axis D. It should be noted that a hole extending in the left-to-right direction may be formed in the wire winding portion 5 instead of the groove 6 and the magnetic wire rod 2 may be disposed within this hole. In addition, as shown in FIG. 1 (B), an insulated electrical wire forming the coil 3 is wound on the outer peripheral portion of the wire winding portion 5.

As shown in FIG. 2, a pair of columnar support portions 7 are respectively provided in the sections at opposite ends of the wire winding portion 5 in the left-to-right direction. The pair of columnar support portions 7 protrude in one direction perpendicular to the axis D of the wire winding portion 5 from the respective sections at opposite ends of the wire winding portion 5 in the left-to-right direction. Specifically, the pair of columnar support portions 7 protrude downwardly from the respective left-end and right-end sections of the wire winding portion 5. In addition, as shown in FIG. 1 (C), the end face, that is, the lower end face 7A, on the protruding end of each columnar support portion 7 is a flat surface that expands in the left-to-right and forward-backward directions. As shown in FIG. 4 (A), once the magnetic sensor 1 is mounted to the substrate 11, the lower end face 7A of each columnar support portion 7 makes contact with a component-carrying surface 11A on the substrate 11.

In addition, as shown in FIG. 4 (A), the amount of downward protrusion of the pair of columnar support portions 7 from the sections at opposite ends of the wire winding portion 5 is configured such that, once the magnetic sensor 1 is mounted to the substrate 11, a component placement space 8 allowing for placement of other components 12 is formed between the section facing the component-carrying surface 11A on the outer peripheral surface of the coil 3 and the component-carrying surface 11A, that is, between the lowest part of the outer peripheral surface of the coil 3 and the component-carrying surface 11A. The term "other components 12" refers to electrical and electronic components other than the magnetic sensor 1 that are contemplated to be disposed on the component-carrying surface 11A of the substrate 11, and includes, for example, resistors, capacitors, diodes, transistors, or integrated circuits, and the like. For example, the other components 12 are electrical and electronic components and the like required to perform sensing with the help of the magnetic sensor 1. For example, the other components 12 are integrated circuit chips having provided thereon counter circuitry that counts the sensed pulses output from the coil 3 of the magnetic sensor 1 or memory chips having provided thereon storage elements that store the number of the sensed pulses counted by the above-mentioned counter circuitry, or custom chips having provided thereon sensing circuitry that includes the above-mentioned counter circuitry and storage elements.

Specifically, the above-mentioned amount of protrusion of each columnar support portion 7 is configured such that, once the magnetic sensor 1 is mounted to the substrate 11, the distance G between the lowest part of the outer peripheral surface of the coil 3 and the component-carrying surface 11A exceeds the height dimension (dimension in the up-down direction) of the other components 12. A broad variety of surface mounting-type (chip-type) electrical and electronic components with a height dimension of 0.8 mm or less are currently in widespread use. If the other components 12 are surface mounting-type electrical and electronic components with a height dimension of 0.8 mm or less, the above-mentioned amount of protrusion of each columnar support portion 7 is configured such that distance G exceeds 0.8 mm. Of course, the other components 12 may be electrical and electronic components with a height dimension of more than 0.8 mm. For example, if the other components 12 are electrical and electronic components with a height dimension of 1.7 mm, the above-mentioned amount of protrusion of each columnar support portion 7 is configured such that distance G exceeds 1.7 mm.

In addition, the above-mentioned amount of protrusion of each columnar support portion 7 may be configured such that, once the magnetic sensor 1 is mounted to the substrate 11, the distance G between the lowest part of the outer peripheral surface of the coil 3 and the component-carrying surface 11A becomes equal to or greater than a value obtained by adding an insulating distance to be ensured between the other components 12 and the magnetic sensor 1 to the height dimension of the other components 12. For example, if the height dimension of the other components 12 is 0.8 mm and the insulating distance to be ensured between the other components 12 and the magnetic sensor 1 is 0.2 mm, the above-mentioned amount of protrusion of each columnar support portion 7 is configured such that distance G is 1 mm or more. In addition, for example, if the height dimension of the other components 12 is 1.7 mm and the insulating distance to be ensured between the other components 12 and the magnetic sensor 1 is 0.2 mm, the above-mentioned amount of protrusion of each columnar support portion 7 is configured such that distance G is 1.9 mm or more.

As shown in FIG. 1 (B), each terminal 9 is formed in an L-shaped configuration from an electrically conductive material, e.g., a metallic material. Each terminal 9 is a surface mounting-type terminal. The pair of terminals 9 are respectively attached and secured to the rear portions of the sections at opposite ends of the wire winding portion 5 or to the rear portions of the pair of columnar support portions 7. In addition, one end of the insulated electrical wire that forms the coil 3, stripped of its insulating jacket, is connected to the top portion of one terminal 9. Furthermore, the other end of the insulated electrical wire that forms the coil 3, stripped of its insulating jacket, is connected to the top portion of the other terminal 9. In addition, when mounting the magnetic sensor 1 to the substrate 11, the bottom rear end section of each terminal 9 is soldered to a connection pad provided on the component-carrying surface 11A of the substrate 11.

Figure 5:
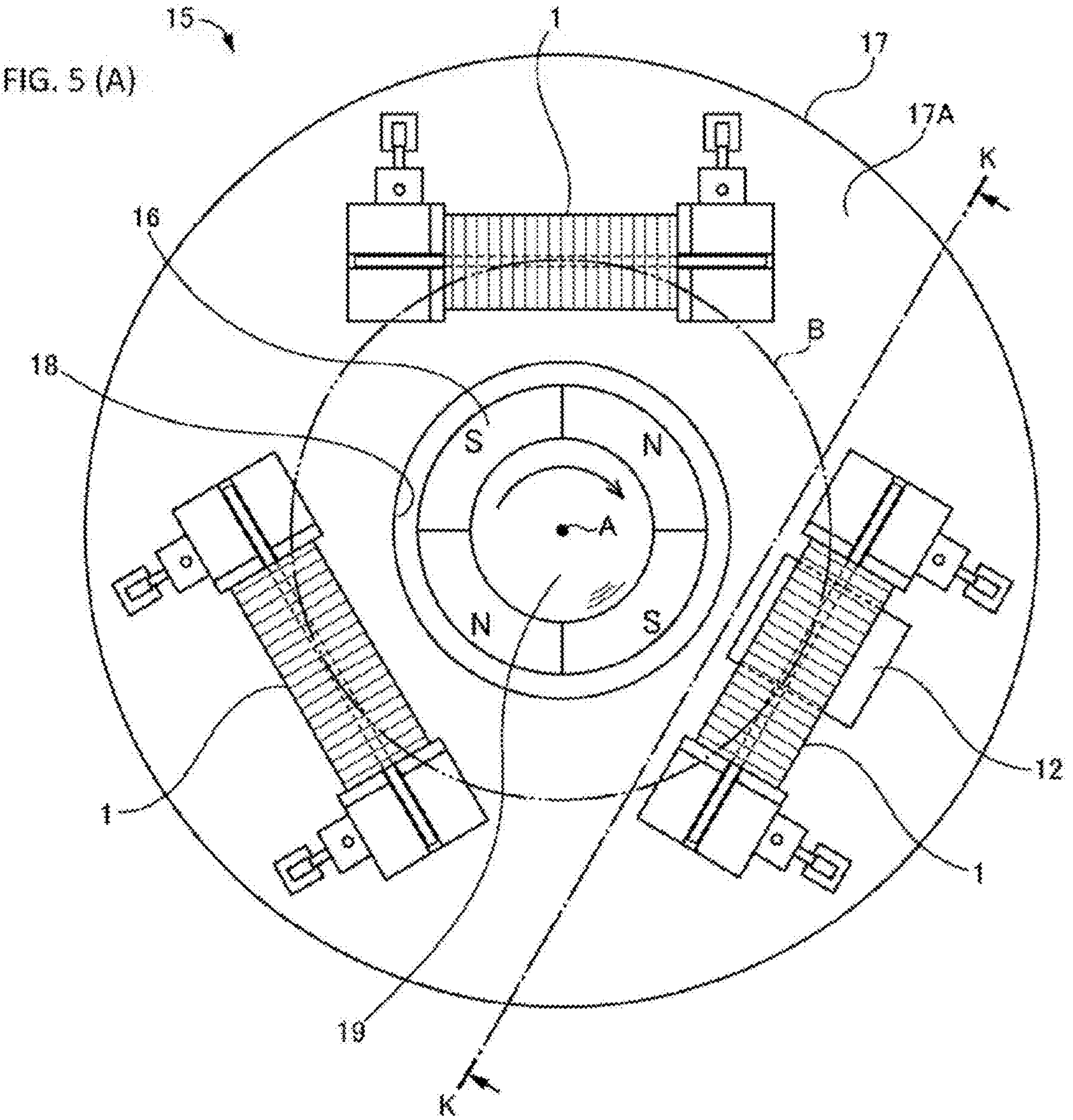
FIGS. 5 (A) and 5 (B) are illustrative views of a rotation sensing device as an example of the use of an embodiment of the inventive magnetic sensor.
Figure 5:
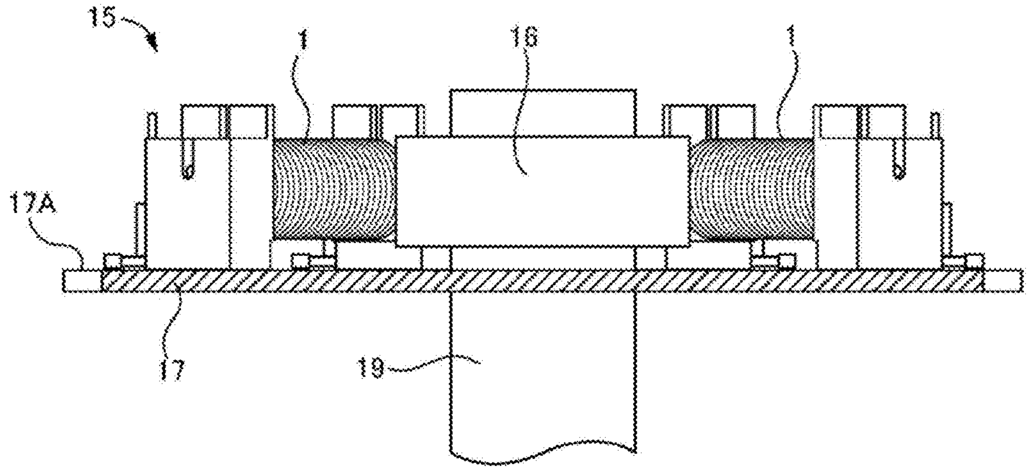
Figure 6:
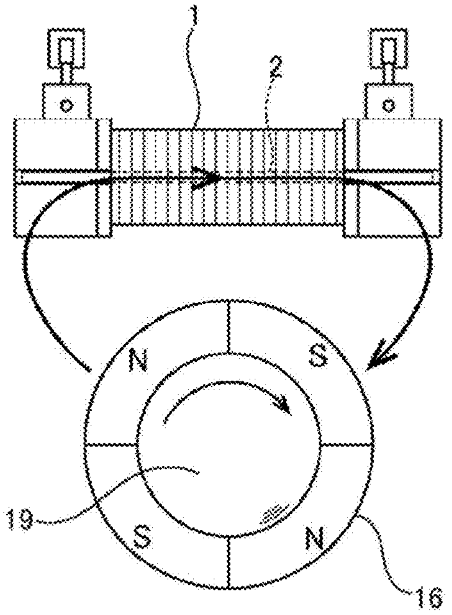
FIGS. 6 (A) to 6 (C) are illustrative views of the operation of a magnetic sensor in the rotation sensing device of FIGS. 5 (A) and 5 (B).
Figure 6:
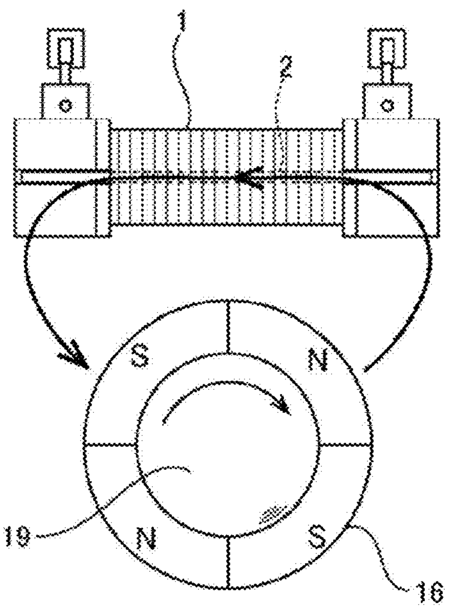
Figure 6:
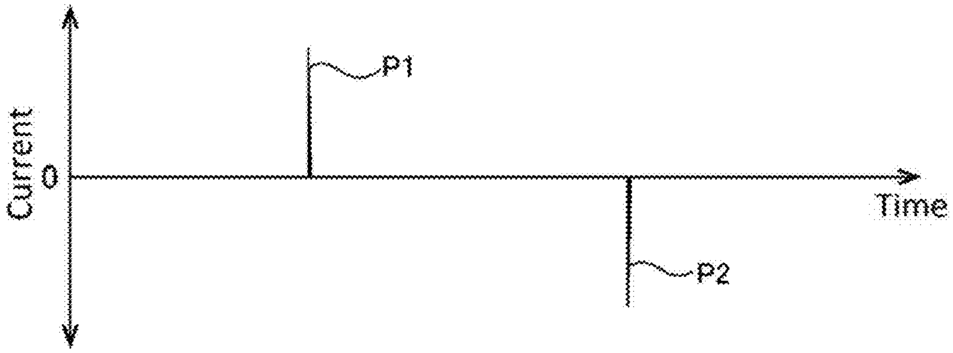

FIGS. 5 and 6 show an example of the use of the magnetic sensor 1. Namely, FIG. 5 (A) shows a rotation sensing device 15 that makes use of three magnetic sensors 1. FIG. 5 (B) is a cross-sectional elevation of the rotation sensing device 15 taken along section line K-K in FIG. 5 (A), as viewed from the bottom right of FIG. 5 (A). FIGS. 6 (A) and 6 (B) show changes in the direction of the magnetic field surrounding a magnetic sensor 1 in response to the rotation of a rotary shaft 19. FIG. 6 (C) shows a current pulse flowing through the coil 3 of the magnetic sensor 1 in response to changes in the direction of the magnetic field.

In FIG. 5 (A), the rotation sensing device 15 is a device that senses the rotation of a rotary shaft 19 that serves as a rotating body. For example, the rotary shaft 19 is an output shaft of a motor. The rotation sensing device 15 comprises a magnetic field forming member 16, three magnetic sensors 1, and a substrate 17.

The magnetic field forming member 16 is formed in an annular configuration from, for example, ferrite or another magnetic material. The magnetic field forming member 16 is disposed on the outer periphery of the rotary shaft 19 coaxially with the rotary shaft 19, and is secured to the rotary shaft 19. The magnetic field forming member 16, which is a multipole-magnetized magnet, has four magnetic poles, i.e., an N pole, an S pole, an N pole, and an S pole, formed, in that order, in the outer peripheral section of the magnetic field forming member 16 at, for example, 90-degree intervals in the circumferential direction of the magnetic field forming member 16. It should be noted that the magnetic field forming member 16 can also be formed from four magnets that are not multipole-magnetized.

The substrate 17 is provided on the outer periphery of the rotary shaft 19. In addition, the substrate 17 is provided in proximity to the magnetic field forming member 16. The substrate 17 is disposed such that the component-carrying surface 17A thereof is facing up. Furthermore, as shown in FIG. 5 (B), the substrate 17 is disposed such that the plane comprising the component-carrying surface 17A is perpendicular to the axis of rotation of the rotary shaft 19. In addition, an insertion through-hole 18 is formed in the central part of the substrate 17, and the rotary shaft 19 is inserted into the insertion through-hole 18. Furthermore, the diameter of the insertion through-hole 18 is larger than the outside diameter of the rotary shaft 19, and the rotary shaft 19 does not come into contact with the substrate 17. In addition, the substrate 17 is secured with brackets to, for example, the housing of the motor in which the rotary shaft 19 is rotatably supported.

The three magnetic sensors 1 are disposed on the component-carrying surface 17A of the substrate 17. In addition, the three magnetic sensors 1 are disposed on the outer periphery of the magnetic field forming member 16 at 120-degree intervals in the direction of rotation of the magnetic field forming member 16. Furthermore, each magnetic sensor 1 is disposed in such a manner that the direction of extension of the axis of the magnetic wire rod 2 is parallel to the component-carrying surface 17A of the substrate 17. In addition, when the component-carrying surface 17A of the substrate 17 is viewed from above, each magnetic sensor 1 is disposed in such a manner that the central part of the magnetic wire rod 2 in the direction of extension is tangential to a circle B whose center coincides with the center of rotation A of the rotary shaft 19 that is drawn around the outer periphery of the magnetic field forming member 16.

The magnetic field forming member 16 is not in contact with any of the three magnetic sensors 1. In addition, while the magnetic field forming member 16 rotates along with the rotary shaft 19, each magnetic sensor 1 is stationary. The magnetic field formed by the magnetic field forming member 16 rotates when the magnetic field forming member 16 rotates along with the rotary shaft 19. This forms a magnetic field (rotating magnetic field) rotating about the axis of rotation of the rotary shaft 19. The three magnetic sensors 1 are placed within this magnetic field. Each magnetic sensor 1 senses changes in the direction of the above-mentioned magnetic field.

The magnetic field sensing operation of the magnetic sensor 1 will be described herein by focusing on one magnetic sensor 1 disposed at the top in FIG. 5 (A) among the three magnetic sensors 1 of FIG. 5 (A). In FIG. 5 (A), an S pole of the magnetic field forming member 16 has approached the left front of the one magnetic sensor 1 at the top, and an N pole of the magnetic field forming member 16 has approached the right front of said magnetic sensor 1. When the rotary shaft 19 rotates 90 degrees clockwise in this state, as shown in FIG. 6 (A), an N pole of the magnetic field forming member 16 approaches the left front of said magnetic sensor 1 and an S pole of the magnetic field forming member 16 approaches the right front of said magnetic sensor 1. At such time, the direction of the magnetic field acting on the magnetic wire rod 2 of said magnetic sensor 1 points to the right. The direction of magnetization of the magnetic wire rod 2, which was leftward immediately prior to that, is thus abruptly reversed to the right. As a result, as shown in FIG. 6 (C), e.g., a positive-going current pulse P1 flows through the coil 3.

Thereafter, when the rotary shaft 19 rotates another 90 degrees clockwise, as shown in FIG. 6 (B), an S pole of the magnetic field forming member 16 approaches the left front of said magnetic sensor 1 and an N pole of the magnetic field forming member 16 approaches the right front of said magnetic sensor 1. At such time, the direction of the magnetic field acting on the magnetic wire rod 2 of said magnetic sensor 1 points to the left. The direction of magnetization of the magnetic wire rod 2, which was rightward immediately prior to that, is thus abruptly reversed to the left. As a result, as shown in FIG. 6 (C), e.g., a negative-going current pulse P2 flows through the coil 3.

Each terminal 9 of each magnetic sensor 1 is electrically connected to the sensing circuitry provided on the substrate 11. In each magnetic sensor 1, the electric currents P1, P2 flowing through the coil 3 are output as sensed pulses to the above-mentioned sensing circuitry. The above-mentioned sensing circuitry senses the amount and direction of rotation, etc., of the rotary shaft 19 based on the sensed pulses output from the respective coils 3 of the three magnetic sensors 1. It should be noted that, for example, the method described in International Publication No. 2016/002437 can be used as a method of sensing the amount and direction of rotation of the rotary shaft 19 in the rotation sensing device 15.

In addition, the above-mentioned sensing circuitry includes, for example, custom chips comprising counter circuitry that count the sensed pulses output from the coil 3 of each magnetic sensor 1, as well as storage elements that store the number of the sensed pulses counted by the above-mentioned counter circuitry, and the like. Three component placement spaces 8 are formed on the component-carrying surface 11A of the substrate 11 by the three magnetic sensors 1 mounted to the substrate 11. The custom chips of the above-mentioned sensing circuitry are disposed as other components 12 on the component-carrying surface 11A in the areas where any one component placement space 8 of these three component placement spaces 8 is formed. For example, the other components 12 of FIG. 5 (A) are custom chips of the above-mentioned sensing circuitry.

As discussed above, in the magnetic sensor 1 representing an embodiment of the inventive magnetic sensor, the bobbin 4 has a pair of columnar support portions 7 and the amount of downward protrusion of the pair of columnar support portions 7 from the sections at opposite ends of the wire winding portion 5 is configured such that, once the magnetic sensor 1 is mounted to the substrate 11, a component placement space 8 allowing for placement of other components 12 is formed between the section on the outer peripheral surface of the coil 3 facing the component-carrying surface 11A and the component-carrying surface 11A itself. With such a configuration, once the magnetic sensor 1 is mounted to the substrate 11, a component placement space 8 is formed between the section having the coil 3 wound thereon in the magnetic sensor 1 and the component-carrying surface 11A. As shown in FIG. 4 (B), the other components 12 can be disposed on the component-carrying surface 11A in the area where the component placement space 8 is formed. In this manner, with the use of the magnetic sensor 1 of the present embodiment, it is possible to increase the area where electrical and electronic components other than said magnetic sensor 1 are disposed on the component-carrying surface 11A having the magnetic sensor 1 disposed thereon.

First Embodiment of Magnetic Sensor Device

A first embodiment of the inventive magnetic sensor device will now be described with reference to FIGS. 7-16. When referred to in the present embodiment, the directions "upward" (Ud), "downward" (Dd), "forward" (Fd), "backward" (Bd), "leftward" (Ld), and "rightward" (Rd) are in accordance with the arrows drawn at the bottom right of FIGS. 7-14. In addition, for ease of discussion, once the magnetic sensor device is disposed on the component-carrying surface of the substrate, the direction away from the component-carrying surface is taken to be "upward," and the direction toward the component-carrying surface is taken to be "downward."

Figure 7:
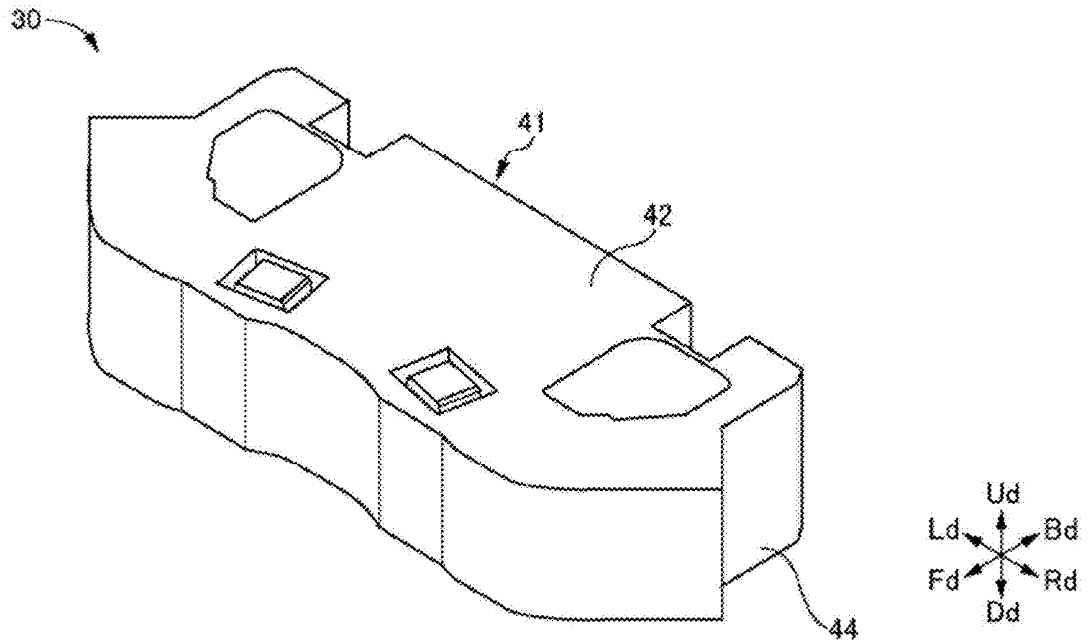
FIGS. 7 (A) and 7 (B) are perspective views of a first embodiment of the inventive magnetic sensor device.
Figure 7:
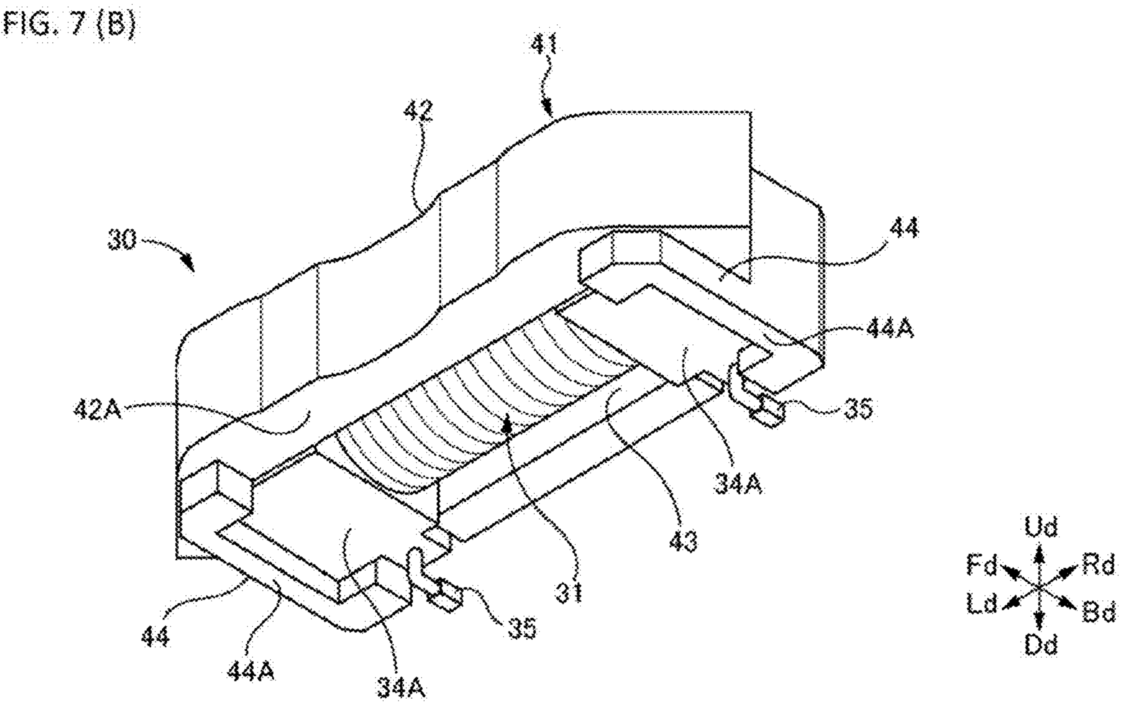
Figure 8:
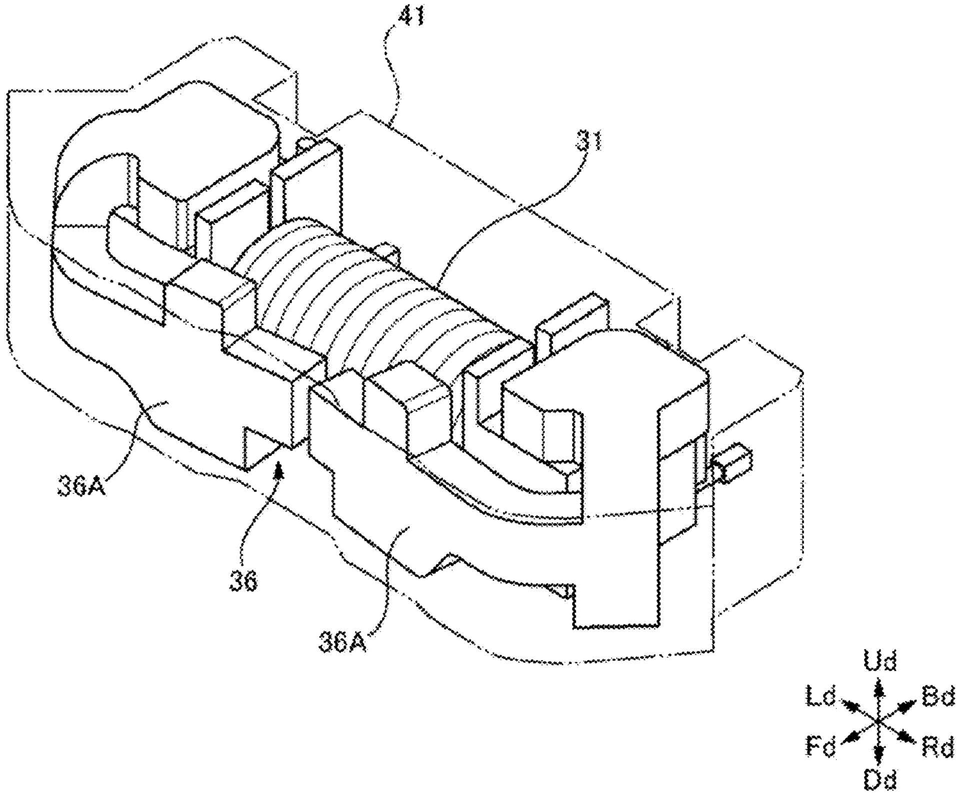
FIG. 8 is a perspective view of a magnetic sensor and a yoke in the first embodiment of the inventive magnetic sensor device.

FIG. 7 (A) shows a front, top, right view of a magnetic sensor device 30 representing the first embodiment of the inventive magnetic sensor device. FIG. 7 (B) shows a front, bottom, right view of the magnetic sensor device 30. FIG. 8 shows a magnetic sensor 31 and a yoke 36 forming part of the magnetic sensor device 30.

The magnetic sensor device 30 is a magnetic sensor device that utilizes a large Barkhausen effect. As shown in FIGS. 7 (A), 7 (B), and 8, the magnetic sensor device 30 comprises a magnetic sensor 31, a yoke 36, and a sensor support member 41. The magnetic sensor 31 is attached to the sensor support member 41, and the yoke 36 is incorporated into the sensor support member 41.

Figure 9:
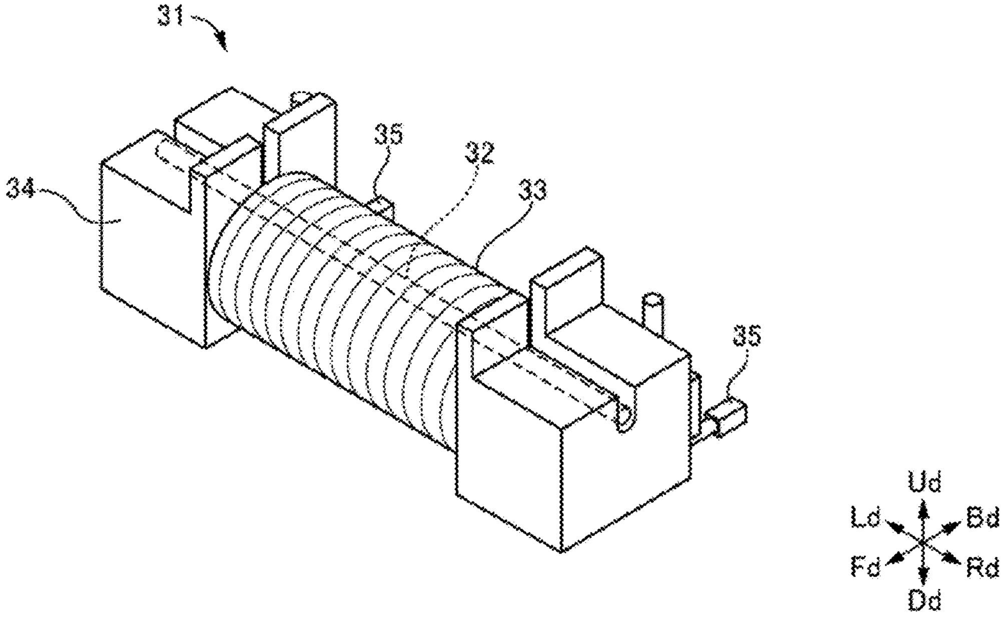
FIG. 9 is a perspective view of the magnetic sensor in the first embodiment of the inventive magnetic sensor device.
Figure 10:
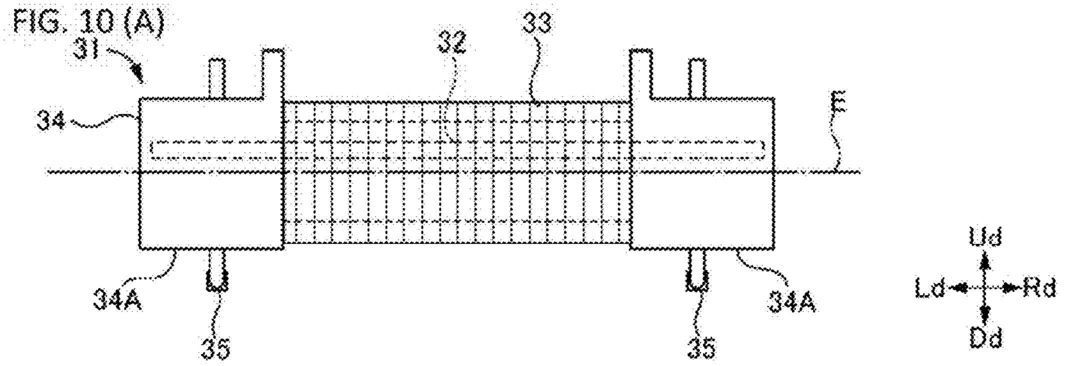
FIGS. 10 (A) to 10 (C) are illustrative views of the magnetic sensor in the first embodiment of the inventive magnetic sensor device.
Figure 10:
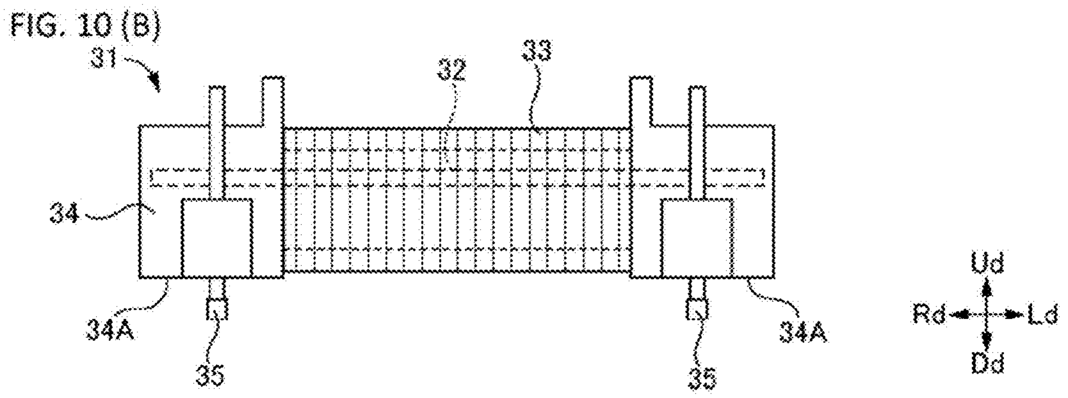
Figure 10:
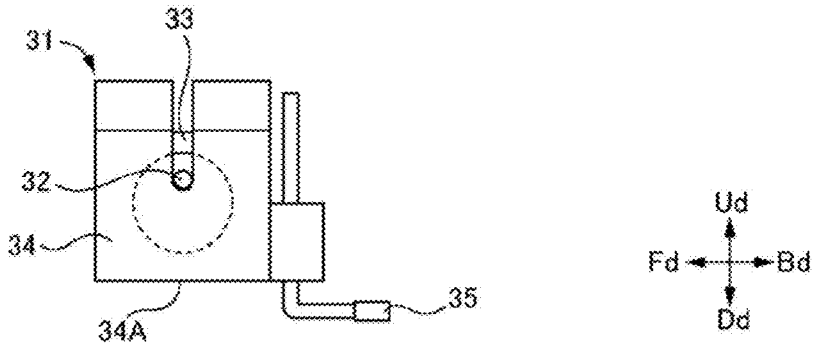
Figure 11:
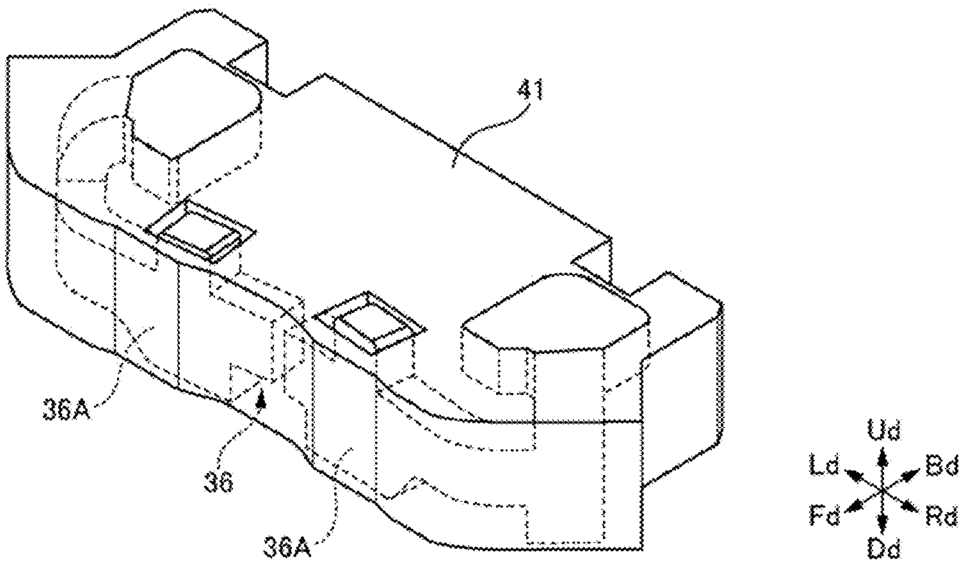
FIG. 11 is an illustrative view of the yoke provided in the interior of the sensor support member in the first embodiment of the inventive magnetic sensor device.

FIG. 9 shows a front, top, right view of the magnetic sensor 31. FIG. 10 (A) shows a front view of the magnetic sensor 31. FIG. 10 (B) shows a rear view of the magnetic sensor 31. FIG. 10 (C) shows a right-side view of the magnetic sensor 31. FIG. 11 shows the yoke 36 and the sensor support member 41.

As shown in FIG. 9, the magnetic sensor 31 comprises a magnetic wire rod 32, a coil 33, a bobbin 34, and a pair of terminals 35. The magnetic wire rod 32 and the coil 33 are identical to the magnetic wire rod 2 and the coil 3 of the magnetic sensor 1 of FIG. 1 (A). In addition, as shown in FIGS. 10 (A-C), the bobbin 34 does not have columnar support portions; in other words, the sections at opposite ends of the bobbin 34 in the left-to-right direction do not protrude downward. With the exception of not having the columnar support portions, the bobbin 34 is identical to the bobbin 4 of the magnetic sensor 1. In addition, in FIG. 10 (A), "E" is the axis of the bobbin 34. Furthermore, each terminal 35 is identical to the terminals 9 of the magnetic sensor 1. However, due to the fact that the bobbin 34 does not have columnar support portions, the bottom portion of each terminal 35 protrudes below the lower face 34A of the bobbin 34. As shown in FIG. 7 (B), the magnetic sensor 31 is attached and secured to a sensor attachment portion 43 provided in the sensor support member 41.

The yoke 36 has the function of controlling the direction of the magnetic flux of the magnetic field acting on the magnetic sensor 31 (magnetic field surrounding the magnetic sensor 31). As shown in FIG. 8, the yoke 36 comprises two yoke pieces 36A. Each yoke piece 36A is formed, for example, from iron or other soft magnetic material. A portion of one yoke piece 36A is disposed in front of the left-hand portion of the magnetic sensor 31, and another portion of the one yoke piece 36A is disposed above the left end portion of the magnetic sensor 31. In addition, a portion of the other yoke piece 36A is disposed in front of the right-hand portion of the magnetic sensor 31, and another portion of the other yoke piece 36A is disposed above the right end portion of the magnetic sensor 31. As shown in FIG. 11, the yoke 36 is incorporated into the front portion of the main body portion 42 of the sensor support member 41. For example, the sensor support member 41 and the yoke 36 are integrally formed by insert molding.

Figure 12:
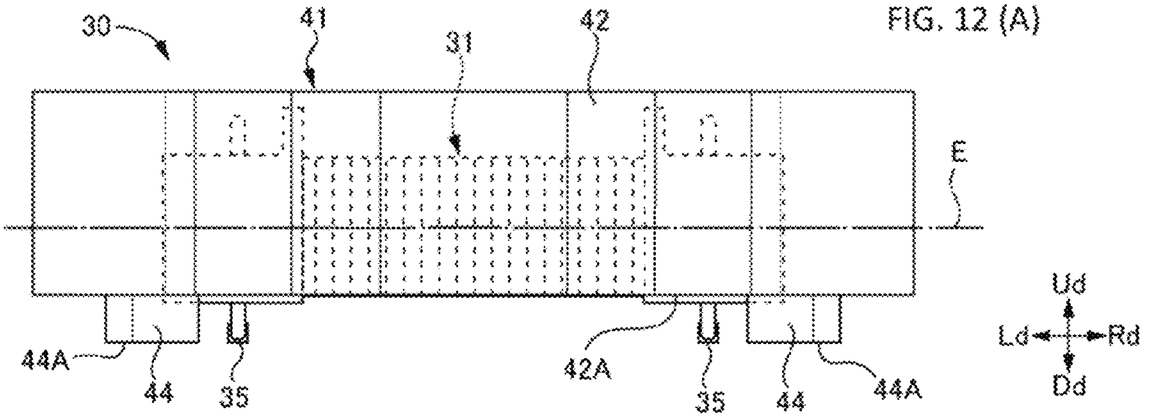
FIGS. 12 (A) to 12 (D) are illustrative views of the first embodiment of the inventive magnetic sensor device.
Figure 12:
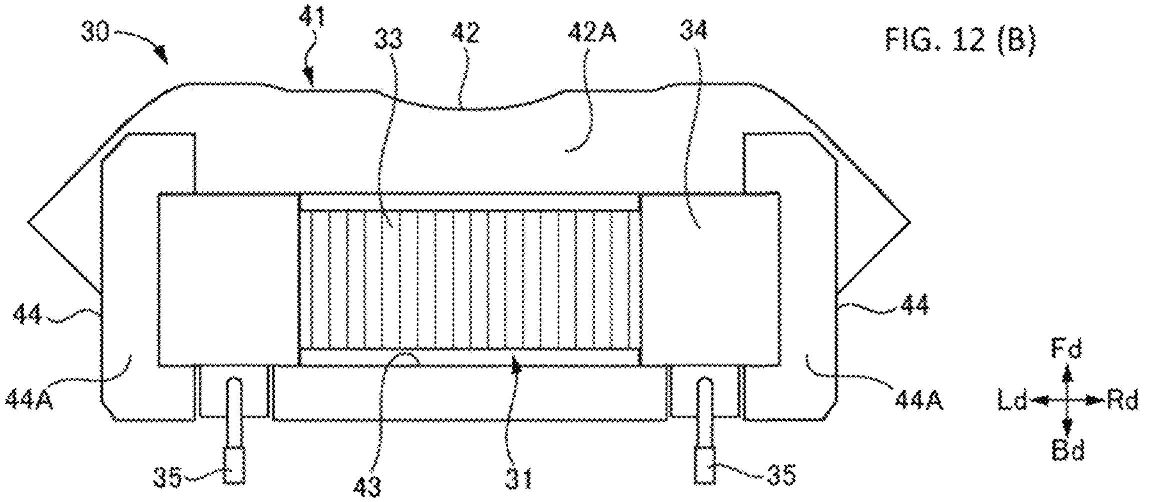
Figure 12:
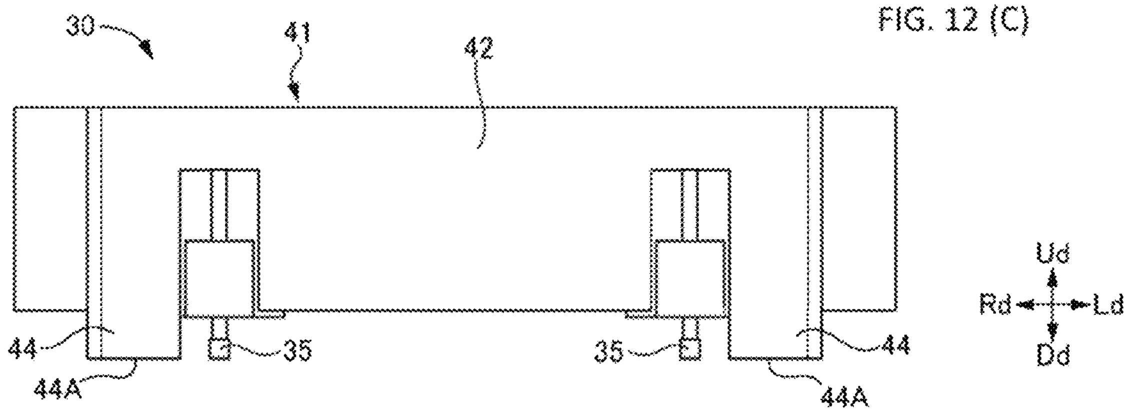
Figure 12:
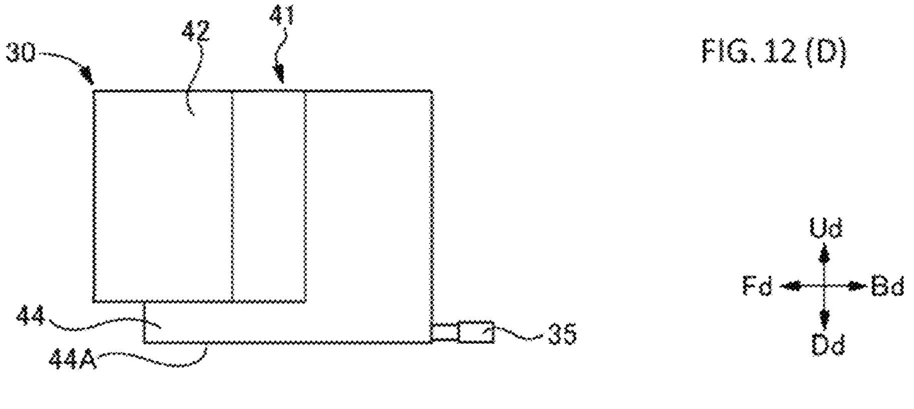
Figure 13:
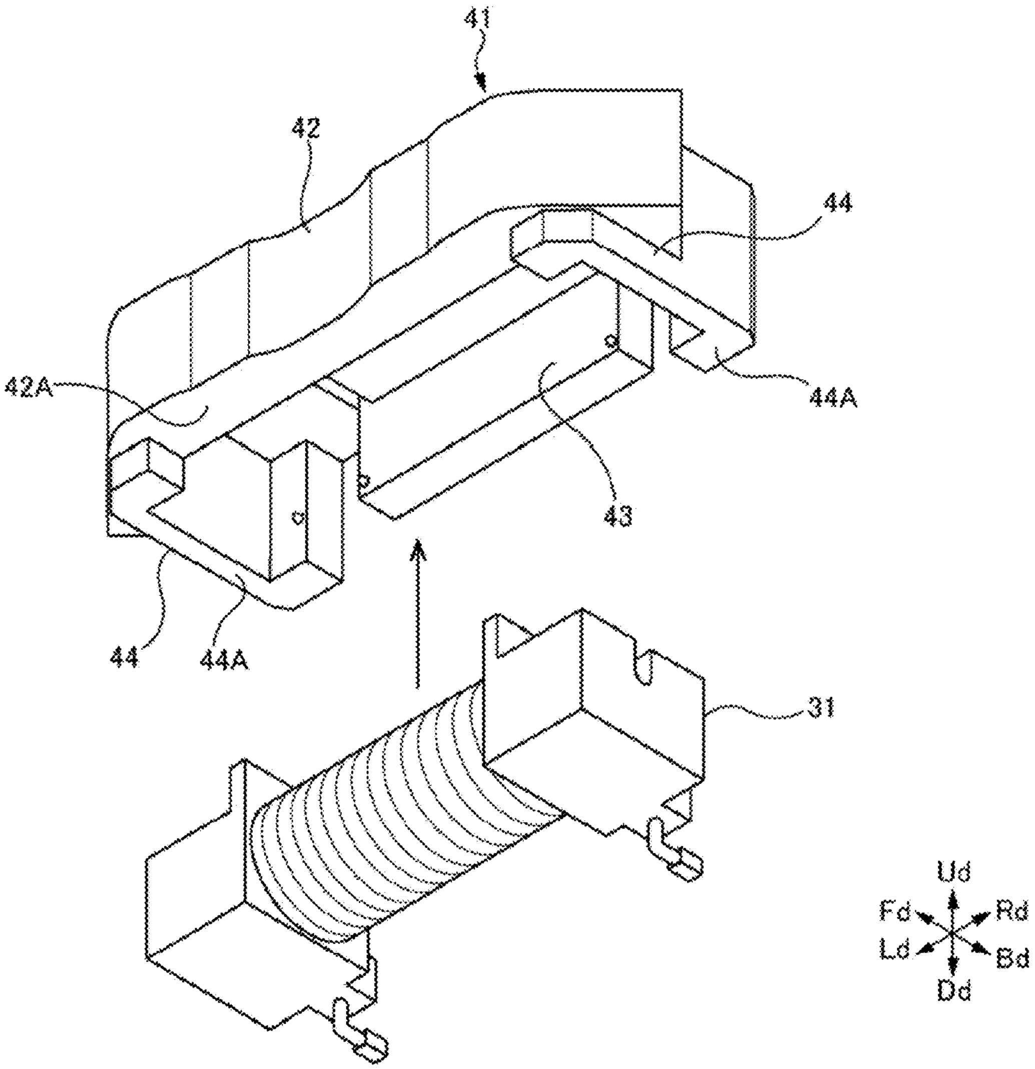
FIG. 13 is an illustrative view of a method of attachment of the magnetic sensor to the sensor support member in the first embodiment of the inventive magnetic sensor device.
Figure 14:
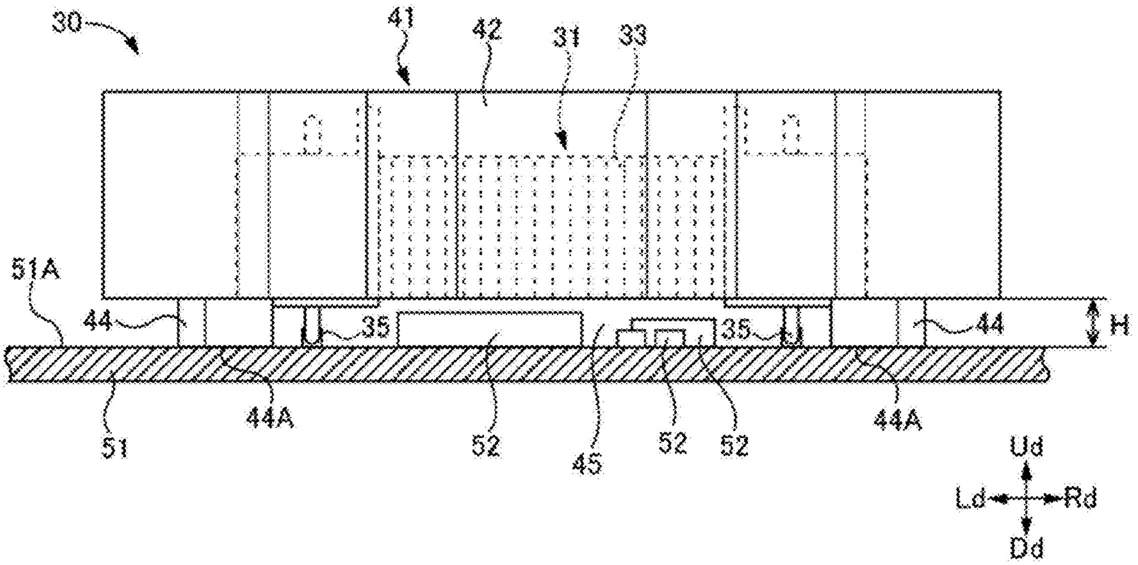
FIGS. 14 (A) to 14 (B) are illustrative views of the first embodiment of the inventive magnetic sensor device mounted to a substrate.
Figure 14:
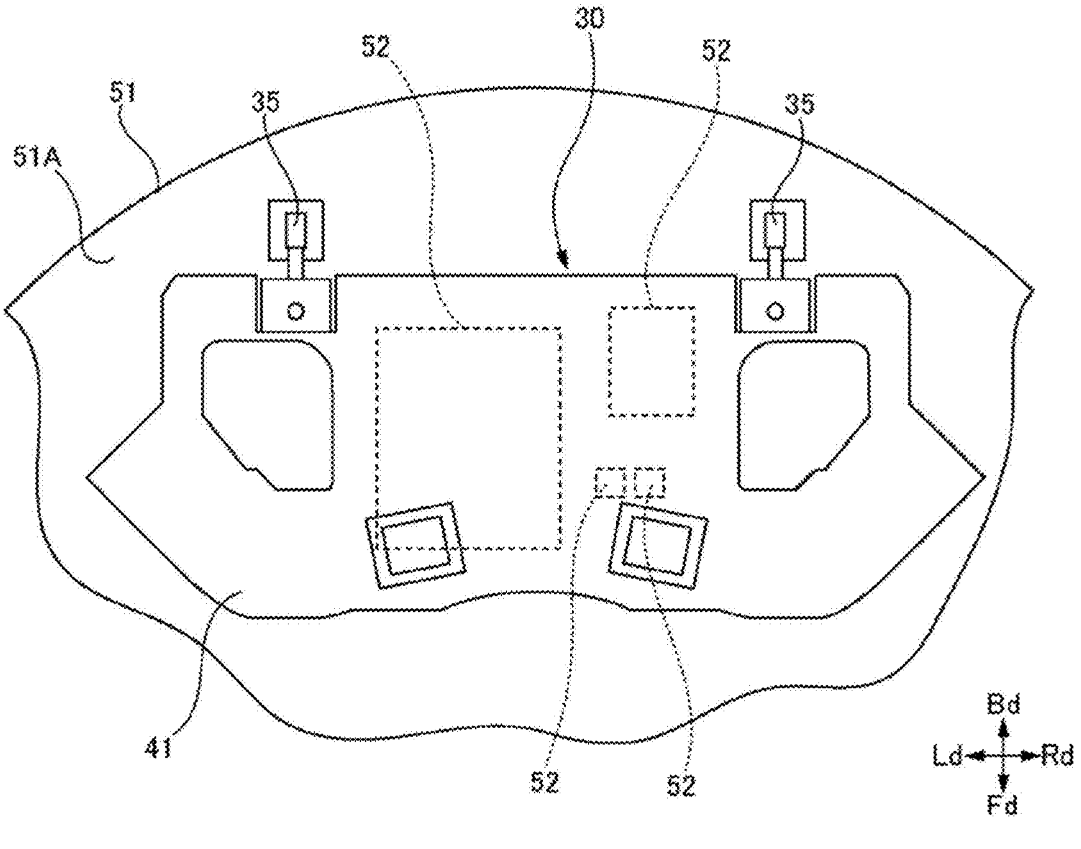

FIG. 12 (A) shows a front view of the magnetic sensor device 30. FIG. 12 (B) shows a bottom view of the magnetic sensor device 30. FIG. 12 (C) shows a rear view of the magnetic sensor device 30. FIG. 12 (D) shows a right-side view of the magnetic sensor device 30. FIG. 13 shows a method of attachment of the magnetic sensor 31 to the sensor support member 41. FIG. 14 (A) shows a front view of the magnetic sensor device 30 mounted to a substrate 51. FIG. 14 (B) shows a top view of the magnetic sensor device 30 mounted to a substrate 51.

In the magnetic sensor device 30, the sensor support member 41 is a component used to support the magnetic sensor 31 and the yoke 36 on the component-carrying surface 51A of the substrate 51. The sensor support member 41 is formed, for example, from plastic or other nonmagnetic material. As shown in FIG. 12 (A-D), the sensor support member 41 has a main body portion 42, a sensor attachment portion 43, and multiple columnar support portions 44.

The main body portion 42 has a predetermined three-dimensional shape extending in a first direction. In the present embodiment, the main body portion 42 is formed in a planar configuration expanding in the left-to-right and forward-backward directions which, as shown in FIG. 12 (A), can cover a major part of the magnetic sensor 31 from above and is also thick enough to be able to incorporate the yoke 36. It should be noted that in the present embodiment, the "first direction" is the left-to-right or forward-backward direction.

The sensor attachment portion 43 is a section used to attach the magnetic sensor 31 to the main body portion 42. The main body portion 42 has a lower face 42A that expands in the left-to-right and forward-backward directions. As shown in FIG. 13, the sensor attachment portion 43 is a long concave portion extending in the left-to-right direction, which is provided in the lower face 42A of the main body portion 42. The magnetic sensor 31 is inserted into the sensor attachment portion 43 from below the main body portion 42. As shown in FIG. 12 (A), the magnetic sensor 31 is attached within the sensor attachment portion 43 such that the axis E of the bobbin 34 is parallel to the lower face 42A of the main body portion 42. In addition, as shown in FIG. 12 (B), the shape of the sensor attachment portion 43 is configured such that the bobbin 34 having the coil 33 provided thereon is inserted snugly and the magnetic sensor 31 is supported within the sensor attachment portion 43. Furthermore, once the magnetic sensor 31 is attached to the sensor attachment portion 43, the position of the lowest part of the outer peripheral surface of the coil 33 of the magnetic sensor 31 and the position of the lower face 42A of the main body portion 42 in the up-down direction substantially coincide.

The multiple columnar support portions 44 are provided on the lower face 42A of the main body portion 42. Each columnar support portion 44 protrudes from the lower face 42A of the main body portion 42 in a second direction intersecting the plane comprising the above-mentioned first direction. In the present embodiment, each columnar support portion 44 protrudes from the lower face 42A of the main body portion 42 in a direction perpendicular to the lower face 42A, that is, downward. It should be noted that, in the present embodiment, the "second direction" is the "downward direction."

In addition, in the present embodiment, the sensor support member 41 has two columnar support portions 44. One columnar support portion 44 is disposed in the left end section of the lower face 42A of the main body portion 42 and the other columnar support portion 44 is disposed in the right end section of the lower face 42A of the main body portion 42. Furthermore, the end face, that is, the lower end face 44A, on the protruding end of each columnar support portion 44 is a flat surface that is parallel to the lower face 42A of the main body portion 42. As shown in FIG. 14 (A), once the magnetic sensor device 30 is mounted to the substrate 51, the lower end face 44A of each columnar support portion 44 makes contact with the component-carrying surface 51A of the substrate 51.

In addition, as shown in FIG. 14 (A), the amount of downward protrusion of the pair of columnar support portions 44 from the lower face 42A is configured such that, once the magnetic sensor device 30 is mounted to the substrate 51, a component placement space 45 allowing for placement of other components 52 is formed between the section on the outer peripheral surface of the coil 33 of the magnetic sensor 31 attached to the sensor attachment portion 43 which faces the component-carrying surface 51A and the component-carrying surface 51A itself, that is, between the lowest part of the outer peripheral surface of said coil 33 and the component-carrying surface 51A. The term "other components 52" refers to electrical and electronic components other than the magnetic sensor device 30 that are contemplated to be disposed on the component-carrying surface 51A of the substrate 51, and the details thereof are similar to the above-described other components 12 of FIG. 4.

Specifically, the above-mentioned amount of protrusion of each columnar support portion 44 is configured such that, once the magnetic sensor device 30 is mounted to the substrate 51, the distance H between the lowest part of the outer peripheral surface of the coil 33 of the magnetic sensor 31 attached to the sensor attachment portion 43 and the component-carrying surface 51A exceeds the height dimension (dimension in the up-down direction) of the other components 52. In addition, the above-mentioned amount of protrusion of each columnar support portion 44 may be configured such that once the magnetic sensor device 30 is mounted to the substrate 51, the distance H between the lowest part of the outer peripheral surface of the coil 33 of the magnetic sensor 31 attached to the sensor attachment portion 43 and the component-carrying surface 51A becomes equal to or greater than a value obtained by adding an insulating distance to be ensured between the other components 52 and the magnetic sensor 31 to the height dimension of the other components 52.

In addition, the lower face of the bottom rear end section of each terminal 35 is positioned co-planar with the lower end face 44A of each columnar support portion 44. When mounting the magnetic sensor device 30 to the substrate 51, the bottom rear end section of each terminal 35 is soldered to a connection pad provided on the component-carrying surface 51A of the substrate 51.

Figure 15:
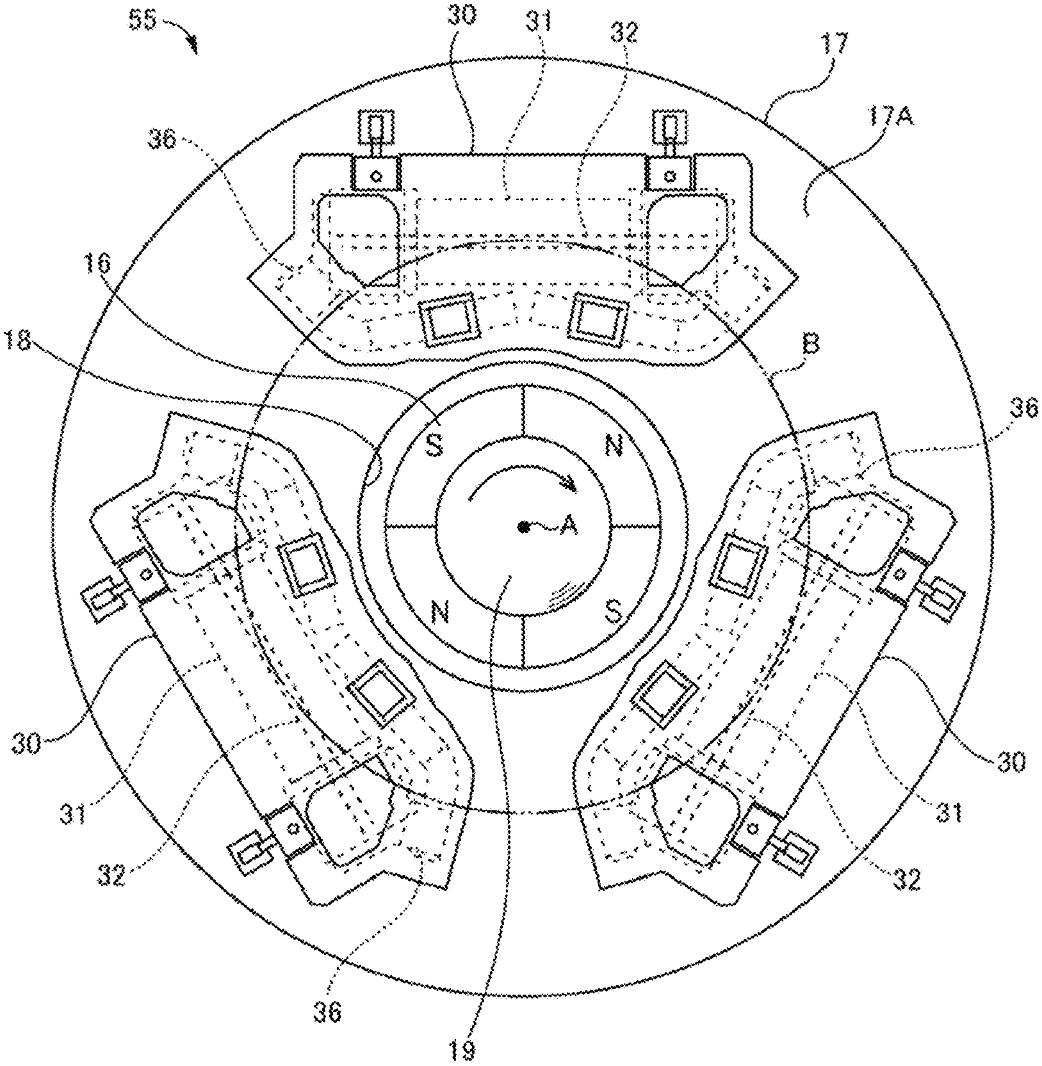
FIG. 15 is an illustrative view of a rotation sensing device as an example of the use of the first embodiment of the inventive magnetic sensor device.
Figure 16:
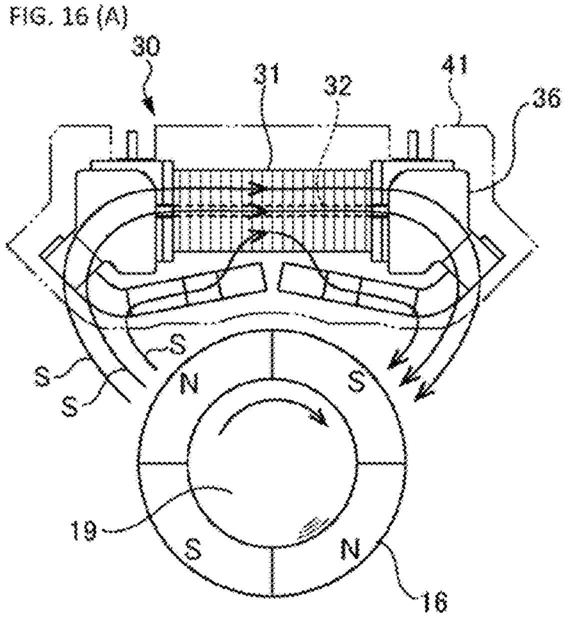
FIGS. 16 (A) and 16 (B) are illustrative views of the functioning of the yoke of the magnetic sensor device in the rotation sensing device of FIG. 15.
Figure 16:
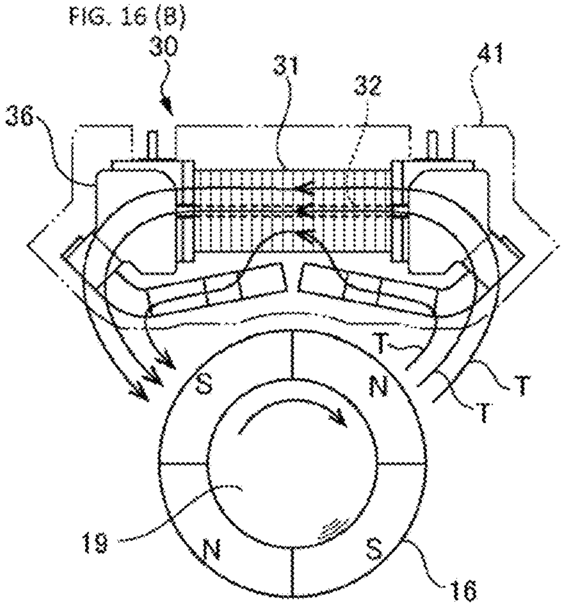

FIGS. 15 and 16 show an example of the use of the magnetic sensor device 30. Namely, FIG. 15 shows a rotation sensing device 55 making use of three magnetic sensor devices 30. FIGS. 16 (A) and 16 (B) show changes in the direction of the magnetic field surrounding the magnetic sensor device 30 in response to the rotation of the rotary shaft 19. In addition, in comparison with the rotation sensing device 15 of FIG. 5, the rotation sensing device 55 of FIG. 15 is the same as rotation sensing device 15 of FIG. 5 except that in the rotation sensing device 55 of FIG. 15 the three magnetic sensors 1 used in the rotation sensing device 15 of FIG. 5 are replaced with three magnetic sensor devices 30. Accordingly, in the rotation sensing device 55 of FIG. 15, the same reference numerals are assigned to the same components as in the rotation sensing device 15 of FIG. 5, and further discussion thereof is abbreviated or omitted.

In FIG. 15, the rotation sensing device 55, which is a device that senses the rotation of the rotary shaft 19, comprises a magnetic field forming member 16, three magnetic sensor devices 30, and a substrate 17.

The three magnetic sensor devices 30 are disposed on the component-carrying surface 17A of the substrate 17. In addition, the three magnetic sensor devices 30 are disposed on the outer periphery of the magnetic field forming member 16 at 120-degree intervals in the direction of rotation of the magnetic field forming member 16. Furthermore, each magnetic sensor device 30 is disposed such that the direction of extension of the axis of the magnetic wire rod 32 of the magnetic sensor 31 is parallel to the component-carrying surface 17A of the substrate 17. In addition, when the component-carrying surface 17A of the substrate 17 is viewed from above, each magnetic sensor device 30 is disposed such that the central part of the magnetic wire rod 32 of the magnetic sensor 31 in the direction of extension is tangential to a circle B whose center coincides with the center of rotation A of the rotary shaft 19 that is drawn around the outer periphery of the magnetic field forming member 16.

The magnetic field forming member 16 is not in contact with any of the three magnetic sensor devices 30. In addition, while the magnetic field forming member 16 rotates along with the rotary shaft 19, each magnetic sensor device 30 is stationary. The magnetic field formed by the magnetic field forming member 16 rotates when the magnetic field forming member 16 rotates along with the rotary shaft 19. This forms a magnetic field (rotating magnetic field) rotating about the axis of rotation of the rotary shaft 19. The three magnetic sensors 31 respectively provided in the three magnetic sensor devices 30 are placed within this magnetic field. Each magnetic sensor 31 senses changes in the direction of the above-mentioned magnetic field.

Due to the fact that the magnetic field sensing operation of each magnetic sensor 31 is essentially the same as the above-described magnetic field sensing operation of the magnetic sensor 1, further discussion thereof is omitted, and the discussion herein will focus on the yoke 36 forming part of each magnetic sensor device 30.

In each magnetic sensor device 30, a yoke 36 is incorporated into the front portion of the main body portion 42 of the sensor support member 41. Once each magnetic sensor device 30 is disposed on the component-carrying surface 51A of the substrate 51 as shown in FIG. 15, the yoke 36 is disposed between the magnetic sensor 31 and the magnetic field forming member 16.

The yoke 36 controls the direction of the magnetic flux such that the magnetic flux of the magnetic field formed by the two magnetic poles of the magnetic field forming member 16 approaching the left front and right front of the magnetic sensor 31 is focused on the magnetic wire rod 32 of the magnetic sensor 31.

Specifically, as shown in FIG. 16 (A), once an N pole of the magnetic field forming member 16 in one magnetic sensor device 30 among the three magnetic sensor devices 30 disposed on the component-carrying surface 51A of the substrate 51 approaches the left front of the magnetic sensor 31 and an S pole of the magnetic field forming member 16 approaches the right front of said magnetic sensor 31, the direction of the magnetic flux of the magnetic field formed by these two magnetic poles of the magnetic field forming member 16 is controlled by the yoke 36 disposed between said magnetic sensor 31 and the magnetic field forming member 16, as shown by the arrows S in FIG. 16 (A). As a result, the magnetic flux of the magnetic field formed by these two magnetic poles is focused on the magnetic wire rod 32 of said magnetic sensor 31.

In addition, as shown in FIG. 16 (B), once an S pole of the magnetic field forming member 16 in said one magnetic sensor device 30 approaches the left front of the magnetic sensor 31 and an N pole of the magnetic field forming member 16 approaches the right front of said magnetic sensor 31, the direction of the magnetic flux of the magnetic field formed by these two magnetic poles of the magnetic field forming member 16 is controlled by the yoke 36 disposed between said magnetic sensor 31 and the magnetic field forming member 16, as shown by the arrows T in FIG. 16 (B). As a result, the magnetic flux of the magnetic field formed by these two magnetic poles is focused on the magnetic wire rod 32 of said magnetic sensor 31.

Since the magnetic flux is focused on the magnetic wire rod 32 by the yoke 36, the magnetic flux flows along the direction of extension of the magnetic wire rod 32 and, furthermore, the magnetic flux reliably passes through the magnetic wire rod 32. Thus, the direction of magnetization of the magnetic wire rod 32 of each magnetic sensor 31 can be reliably reversed in response to changes in the magnetic field formed by the rotating magnetic field forming member 16, and the pulse waveform of the current pulse flowing through the coil 33 in response to the reversal of the direction of magnetization of the magnetic wire rod 32 can be sharpened.

As discussed above, in the magnetic sensor device 30 representing the first embodiment of the inventive magnetic sensor device, the sensor support member 41 has multiple columnar support portions 44 and the amount of downward protrusion of each columnar support portion 44 from the lower face 42A of the main body portion 42 is configured such that, once the magnetic sensor device 30 is mounted to the substrate 51, a component placement space 45 allowing for placement of other components 52 is formed between the section on the outer peripheral surface of the coil 33 of the magnetic sensor 31 attached to the sensor attachment portion 43 which faces the component-carrying surface 51A and the component-carrying surface 51A itself. With such a configuration, once the magnetic sensor device 30 is mounted to the substrate 51, a component placement space 45 is formed between the section having the coil 33 wound thereon in the magnetic sensor 31 attached to the sensor attachment portion 43 and the component-carrying surface 51A.

Further, in the magnetic sensor device 30 of the present embodiment, once the magnetic sensor device 30 is mounted to the substrate 51, the entire main body portion 42 is raised by the columnar support portions 44. Namely, the entire main body portion 42 is disposed in a position spaced away from and above the component-carrying surface 51A, and the distance between the lower face 42A of the main body portion 42 and the component-carrying surface 51A is substantially the same as the distance H between the section on the outer peripheral surface of the coil 33 of the magnetic sensor 31 attached to the sensor attachment portion 43 which faces the component-carrying surface 51A and the component-carrying surface 51A itself. As a result, a component placement space 45 allowing for placement of other components 52 is formed not only between the section having the coil 33 wound thereon in the magnetic sensor 31 attached to the sensor attachment portion 43 and the component-carrying surface 51A, but also between the intermediate portion of the lower face 42A of the main body portion 42 in the left-to-right direction and the component-carrying surface 51A.

As shown in FIG. 14 (B), other components 52 can be disposed on the component-carrying surface 51A in the area where the component placement space 45 is formed. In this manner, with the use of the magnetic sensor device 30 of the present embodiment, it is possible to increase the area where electrical and electronic components other than the magnetic sensor device 30 are disposed on the component-carrying surface 51A of the substrate 51 having the magnetic sensor device 30 disposed thereon.

In addition, in the magnetic sensor device 30 of the present embodiment, the yoke 36 is provided in the interior of the main body portion 42 of the sensor support member 41. Moreover, once the magnetic sensor device 30 is mounted to the substrate 51, the columnar support portions 44 place the main body portion 42 in a position spaced away from and above the component-carrying surface 51A of the substrate 51. For this reason, once the magnetic sensor device 30 is mounted to the substrate 51, the yoke 36 is disposed in a position spaced away from and above the component-carrying surface 51A of the substrate 51. In addition, once the magnetic sensor device 30 is mounted to the substrate 51, a portion of the component placement space 45 is positioned under a major part of the yoke 36. As a result, other components 52 can also be disposed under the yoke 36. In this manner, with the use of the magnetic sensor device 30 of the present embodiment and as consequence of providing the yoke 36, it is possible to reduce the areas where electrical and electronic components other than the magnetic sensor device 30 cannot be disposed on the component-carrying surface 51A of the substrate 51.

Second Embodiment of Magnetic Sensor Device

A second embodiment of the inventive magnetic sensor device will now be described with reference to FIGS. 17-28. When referred to in the present embodiment, the directions "upward" (Ud), "downward" (Dd), "forward" (Fd), "backward" (Bd), "leftward" (Ld), and "rightward" (Rd) are in accordance with the arrows drawn at the bottom right of FIGS. 20-24 and 27. In addition, for ease of discussion, once the magnetic sensor device is disposed on the component-carrying surface of the substrate, the direction away from the component-carrying surface is taken to be "upward," and the direction toward the component-carrying surface is taken to be "downward."

Figure 17:
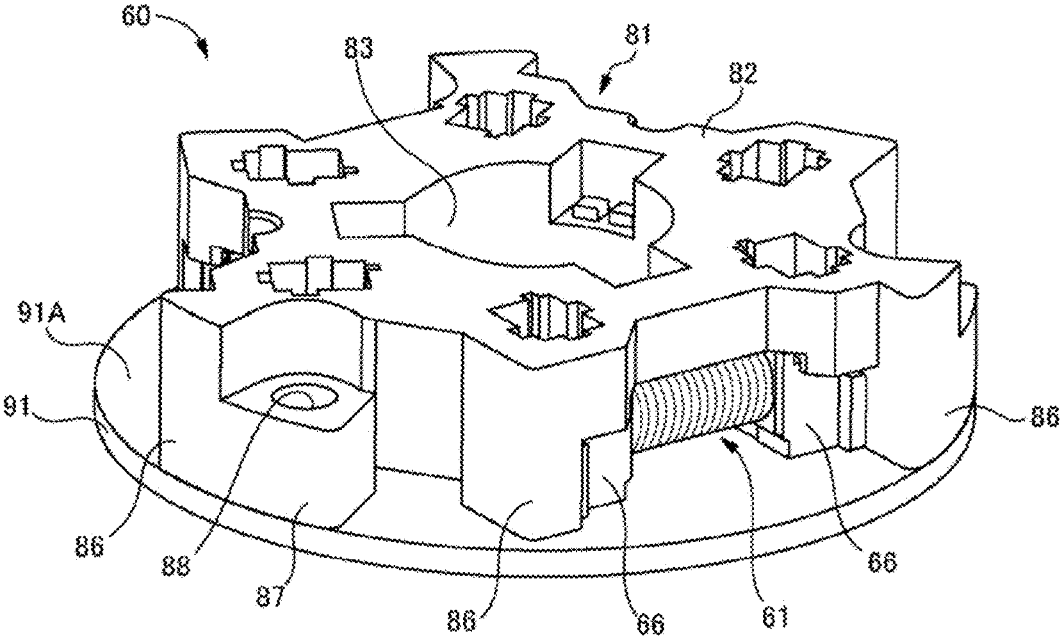
FIG. 17 is a perspective view of a second embodiment of the inventive magnetic sensor device mounted to a substrate, as viewed obliquely from above.
Figure 18:
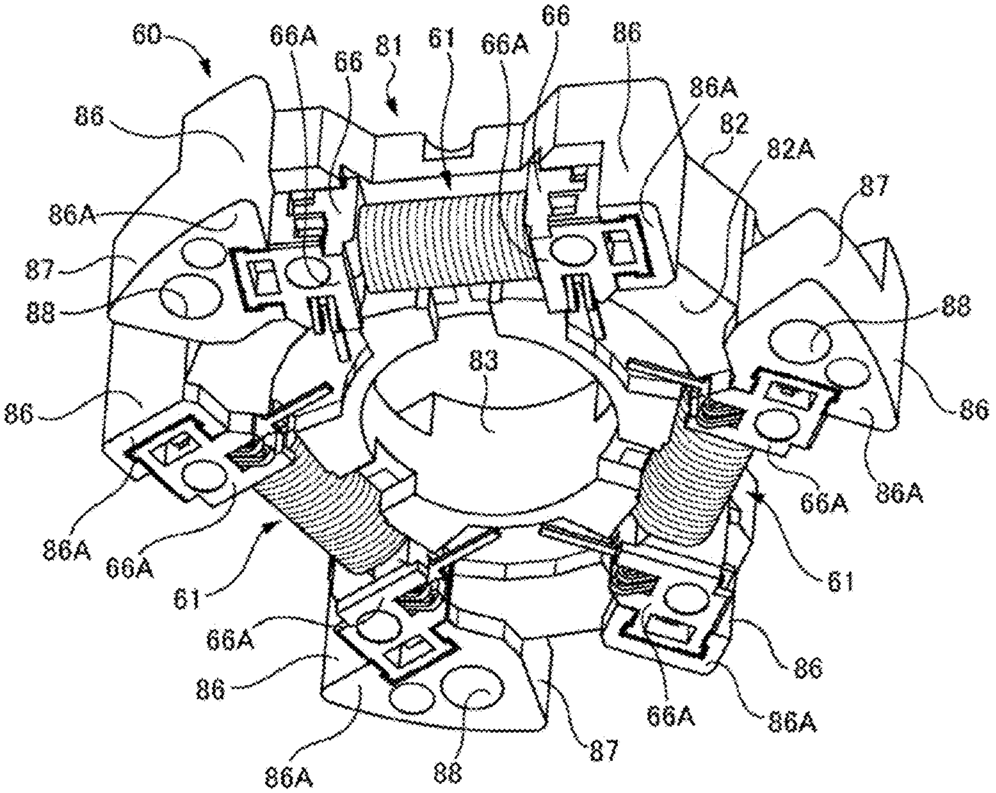
FIG. 18 is a perspective view of the second embodiment of the inventive magnetic sensor device, as viewed obliquely from below.
Figure 19:
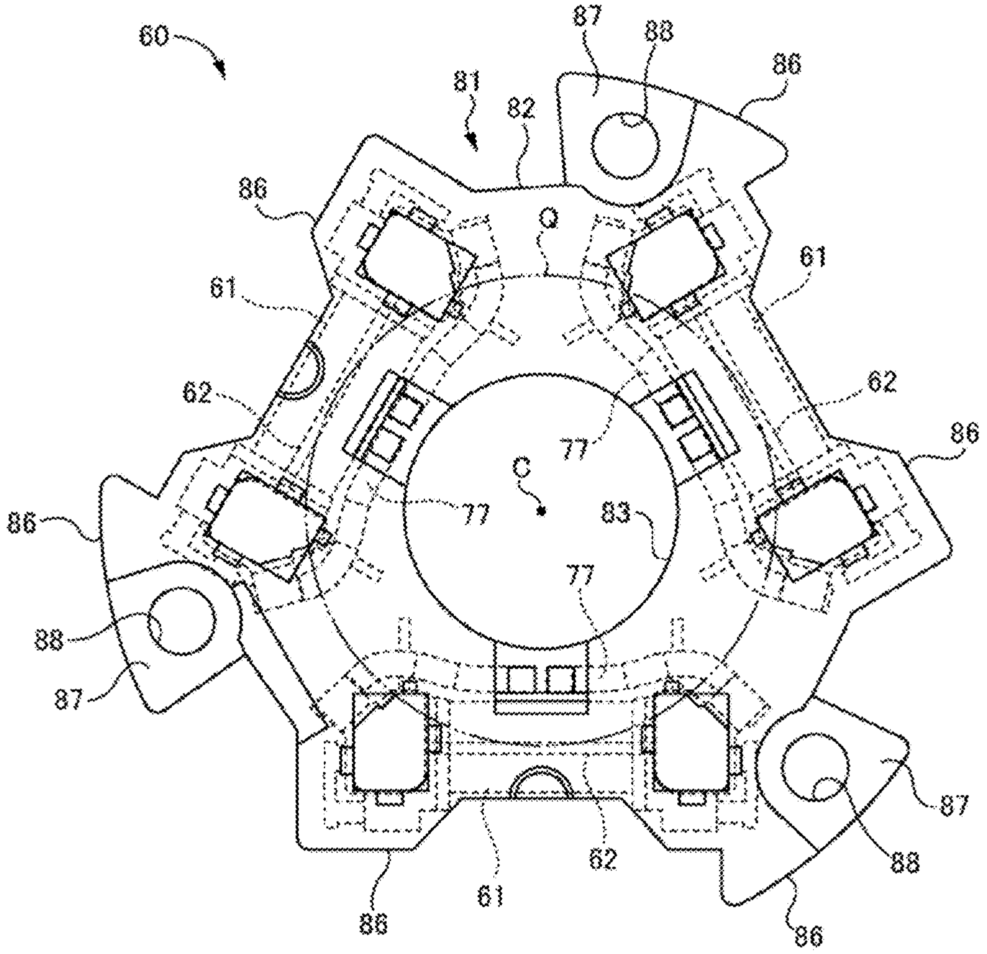
FIG. 19 is an illustrative top view of the second embodiment of the inventive magnetic sensor device.
Figure 20:
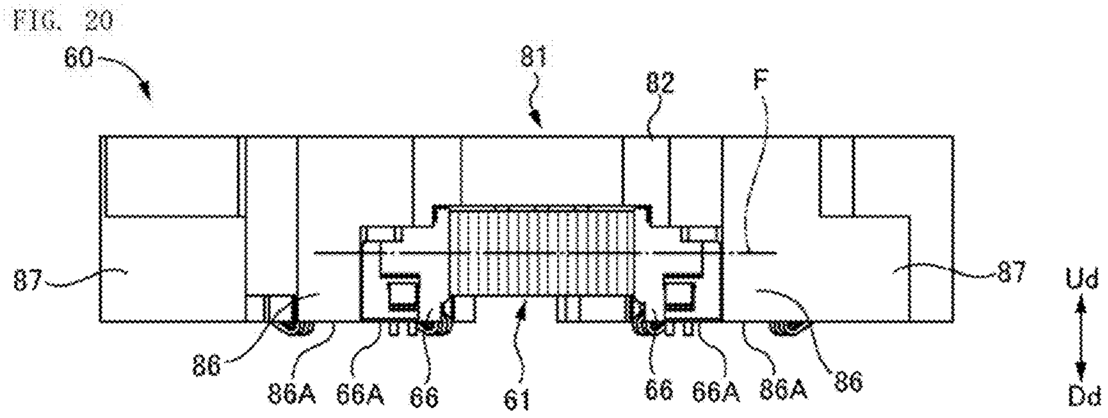
FIG. 20 is an illustrative lateral view of the second embodiment of the inventive magnetic sensor device.
Figure 21:
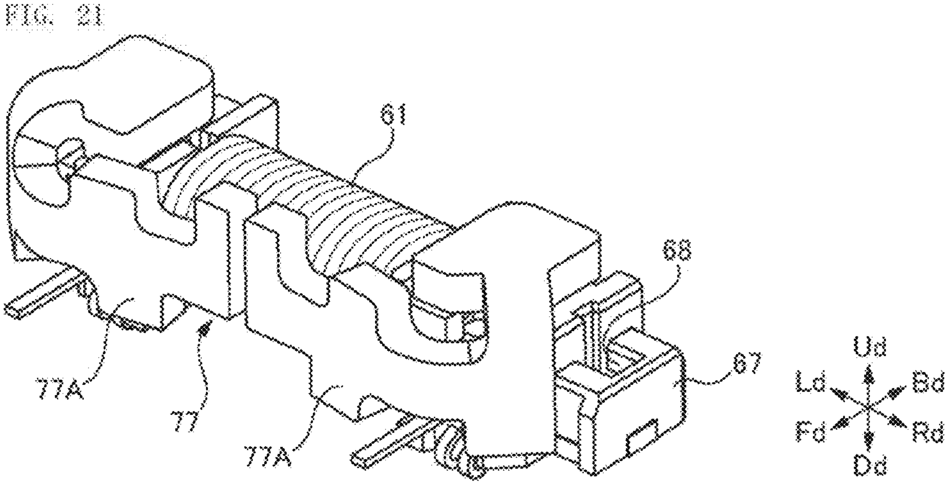
FIG. 21 is a perspective view of a magnetic sensor and a yoke in the second embodiment of the inventive magnetic sensor device.

FIG. 17 shows a magnetic sensor device 60 representing the second embodiment of the inventive magnetic sensor device, as viewed obliquely from above. In FIG. 17, the magnetic sensor device 60 is shown mounted to a substrate 91. FIG. 18 shows an oblique bottom view of the magnetic sensor device 60. FIG. 19 shows a top view of the magnetic sensor device 60. FIG. 20 shows a lateral view of the magnetic sensor device 60. FIG. 21 shows one magnetic sensor 61 among the three magnetic sensors 61 forming part of the magnetic sensor device 60 and one yoke 77 among the three yokes 77 forming part of the magnetic sensor device 60.

The magnetic sensor device 60 is a magnetic sensor device that utilizes a large Barkhausen effect. As shown in FIGS. 17-21, the magnetic sensor device 60 comprises three magnetic sensors 61, three yokes 77, and a sensor support member 81. The three magnetic sensors 61 are attached to the sensor support member 81, and the three yokes 77 are incorporated into the sensor support member 81. In addition, the configurations of the three magnetic sensors 61 are identical to one another, and the configurations of the three yokes 77 are identical to one another.

Figure 22:
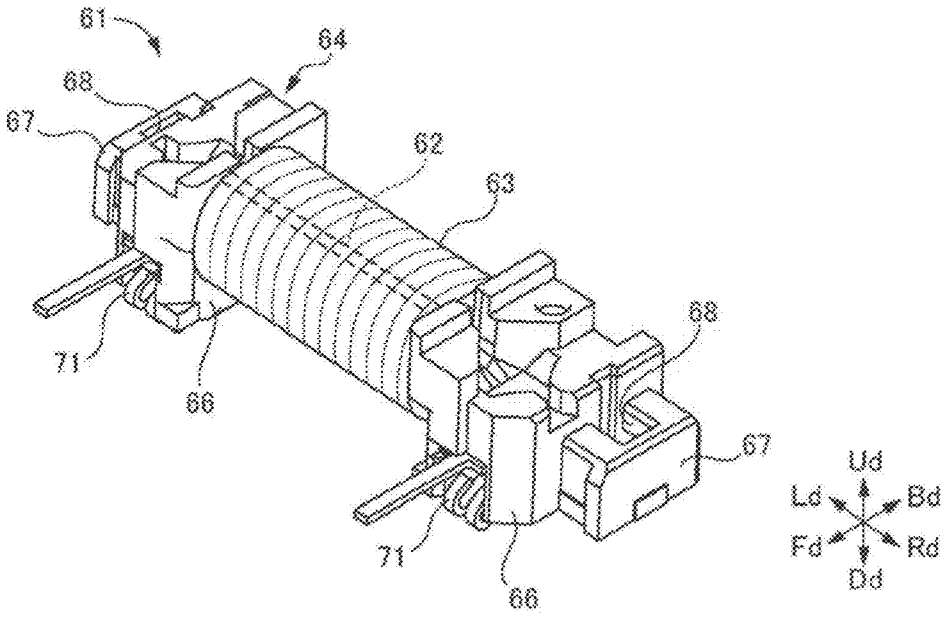
FIGS. 22 (A) and 22 (B) are perspective views of the magnetic sensor in the second embodiment of the inventive magnetic sensor device.
Figure 22:
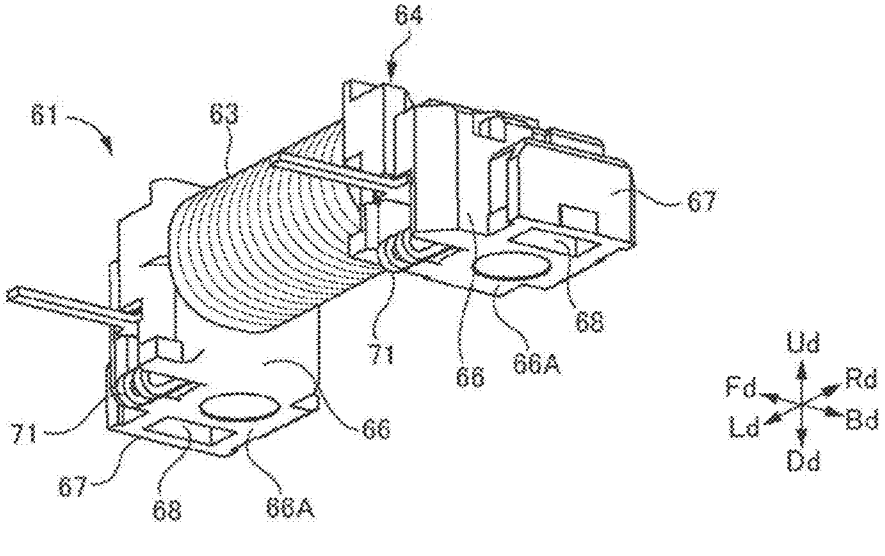
Figure 23:
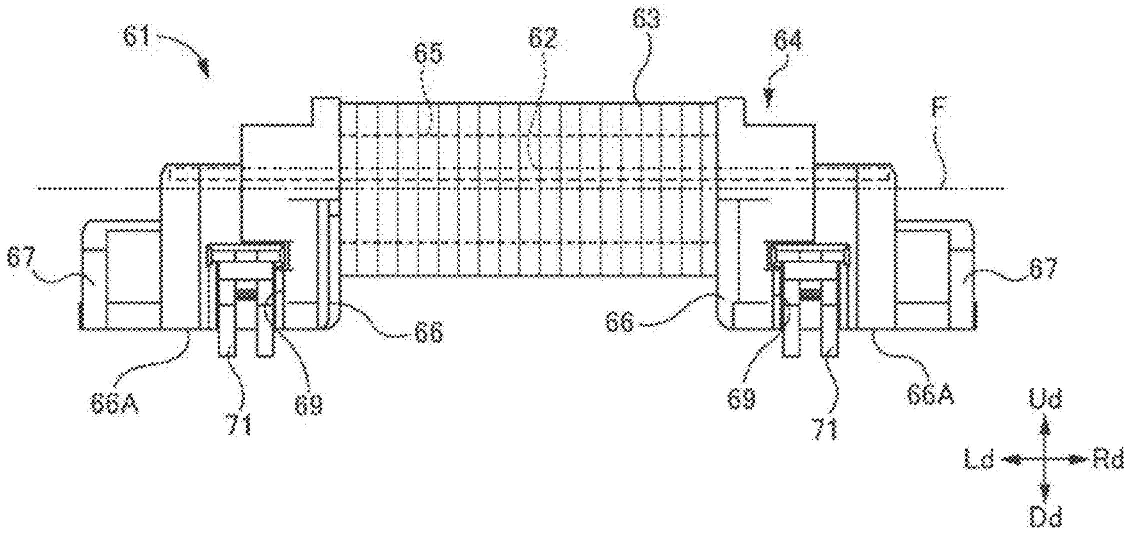
FIGS. 23 (A) and 23 (B) are illustrative views of the magnetic sensor in the second embodiment of the inventive magnetic sensor device.
Figure 23:
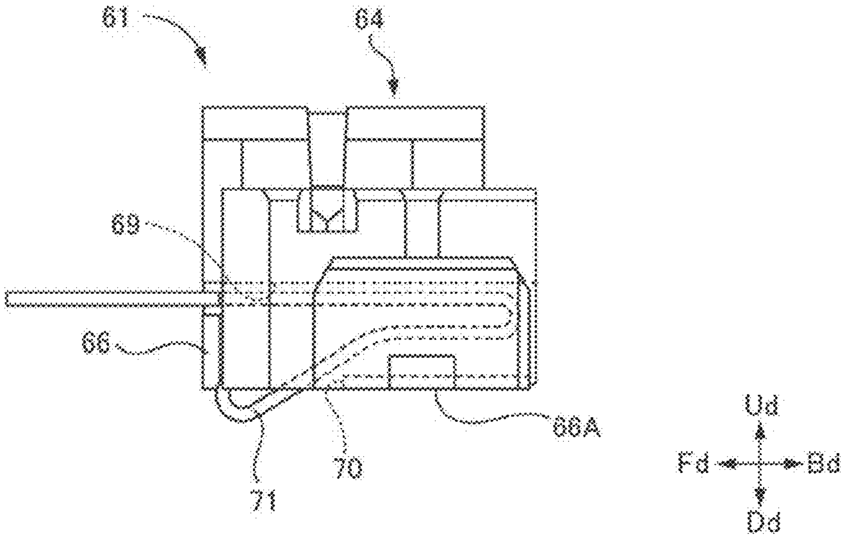

FIG. 22 (A) shows a front, top, right view of one magnetic sensor 61 among the three magnetic sensors 61 forming part of the magnetic sensor device 60. FIG. 22 (B) shows a front, bottom, right view of the magnetic sensor 61 of FIG. 22 (A). FIG. 23 (A) shows a front view of the magnetic sensor 61 of FIG. 22 (A). FIG. 23 (B) shows a right-side view of the magnetic sensor 61 of FIG. 22 (A).

As shown in FIG. 22 (A), the magnetic sensor 61 comprises a magnetic wire rod 62, a coil 63, a bobbin 64, and a pair of terminals 71. The magnetic wire rod 62 and the coil 63 are identical to the magnetic wire rod 2 and the coil 3 of the magnetic sensor 1 of FIG. 1 (A).

In addition, as can be appreciated from a comparison of FIG. 2 and FIG. 23 (A), in the same manner as the bobbin 4 forming part of the magnetic sensor 1 illustrated in FIG. 2, the bobbin 64 forming part of the magnetic sensor 61 illustrated in FIG. 23 (A) has a wire winding portion 65 and a pair of columnar support portions 66. In the same manner as the wire winding portion 5 of the magnetic sensor 1, the wire winding portion 65 of the magnetic sensor 61 is formed in a cylindrical configuration extending in the left-to-right direction and, furthermore, the axis F of the wire winding portion 65 extends in the left-to-right direction. In addition, in the same manner as the wire winding portion 5 of the magnetic sensor 1, the wire winding portion 65 of the magnetic sensor 61 has the magnetic wire rod 62 disposed therein. Furthermore, an insulated electrical wire forming the coil 63 is wound on the outer peripheral portion of the wire winding portion 65 of the magnetic sensor 61.

A pair of columnar support portions 66 are respectively provided in the sections at opposite ends of the wire winding portion 65 in the left-to-right direction. The pair of columnar support portions 66 protrude in one direction perpendicular to the axis F of the wire winding portion 65 from the respective sections at opposite ends of the wire winding portion 65 in the left-to-right direction. Specifically, the pair of columnar support portions 66 protrude downwardly from, respectively, the left end section and the right end section of the wire winding portion 65. In addition, as shown in FIG. 22 (B), the end face, that is, the lower end face 66A, on the protruding end of each columnar support portion 66 is a flat surface that expands in the left-to-right and forward-backward directions. Once the magnetic sensor device 60 is mounted to the substrate 91, the lower end face 66A of each columnar support portion 66 makes contact with the component-carrying surface 91A of the substrate 91 (see FIGS. 26 and 27).

In addition, the amount of downward protrusion of the pair of columnar support portions 66 from the sections at opposite ends of the wire winding portion 65 is configured such that, once the magnetic sensor device 60 is mounted to the substrate 91, component placement spaces 89 (see FIG. 27) allowing for placement of other components 92 are formed between the sections on the outer peripheral surface of the coils 63 of the magnetic sensors 61 facing the component-carrying surface 91A and the component-carrying surface 91A itself, that is, between the lowest part of the outer peripheral surface of the coils 63 and the component-carrying surfaces 91A. The term "other components 92" refers to electrical and electronic components other than the magnetic sensor device 60 that are contemplated to be disposed on the component-carrying surface 91A of the substrate 91, and the details thereof are similar to the above-described other components 12 of FIG. 4.

Figure 27:
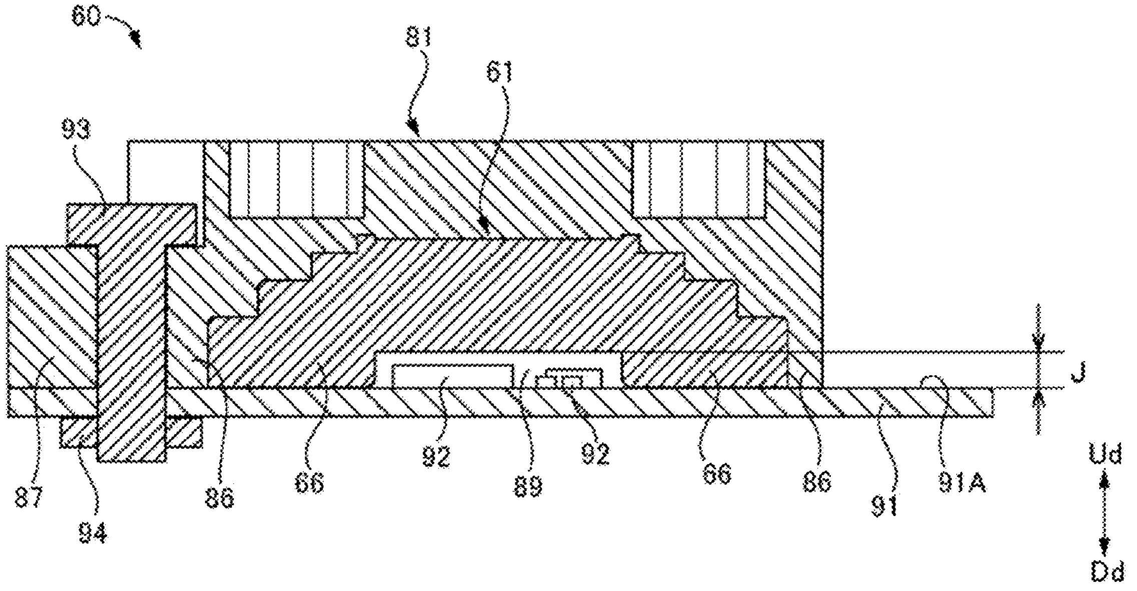
FIG. 27 is a cross-sectional view of the magnetic sensor device taken along section line L-L in FIG. 26.

Specifically, the above-mentioned amount of protrusion of each columnar support portion 66 is configured such that, once the magnetic sensor device 60 is mounted to the substrate 91, the distance J between the lowest part of the outer peripheral surface of the coils 63 and the component-carrying surface 91A exceeds the height dimension (dimension in the up-down direction) of the other components 92 (see FIG. 27). In addition, the above-mentioned amount of protrusion of each columnar support portion 66 may be configured such that, once the magnetic sensor device 60 is mounted to the substrate 91, the distance J between the lowest part of the outer peripheral surface of the coils 63 and the component-carrying surface 91A becomes equal to or greater than a value obtained by adding an insulating distance to be ensured between the other components 92 and the magnetic sensors 61 to the height dimension of the other components 92.

In addition, as shown in FIG. 23 (A), two joining portions 67 used for joining the magnetic sensors 61 to the sensor support member 81 are provided in the bobbin 64. One joining portion 67 is provided to the left of the left-hand columnar support portion 66, and the other joining portion 67 is provided to the right of the right-hand columnar support portion 66. In addition, as shown in FIG. 22 (A), joining holes 68 for inserting joining projections 85 provided in the sensor attachment portions 84 of the sensor support member 81 are formed in each joining portion 67.

Figure 24:
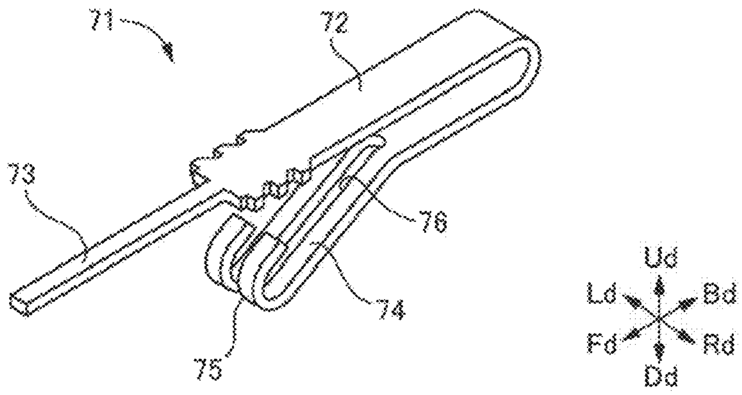
FIG. 24 is a perspective view of a terminal-forming part of the magnetic sensor in the second embodiment of the inventive magnetic sensor device.

Each terminal 71 is a compression terminal. It should be noted that compression terminals are sometimes referred to as "spring terminals." FIG. 24 shows a terminal 71. Each terminal 71, as shown in FIG. 24, is formed from an electrically conductive material, for example, a metallic material. Each terminal 71 has a base portion 72, an electrical wire connecting portion 73, a spring portion 74, and a contact portion 75. The base portion 72 is formed in the shape of a plate curved in a U-shaped configuration. The electrical wire connecting portion 73 protrudes forwardly from the upper front end portion of the base portion 72. One end of the insulated electrical wire that forms the coil 63, stripped of its insulating jacket, is connected to the electrical wire connecting portion 73. The spring portion 74 protrudes downwardly and rearwardly from the lower front end portion of the base portion 72, and the contact portion 75 is provided in the protruding end portion of the spring portion 74. In addition, a slit 76 is formed in the spring portion 74 and in the contact portion 75. The spring portion 74, which is a section serving as a flat spring, can displace the contact portion 75 in the up-down direction via resilient deformation. The contact portion 75 makes contact with a connection pad provided on the component-carrying surface 91A of the substrate 91.

As shown in FIG. 23 (A), a terminal attachment hole 69 is provided in the front face of each columnar support portion 66 of the bobbin 64. The terminals 71 are attached and secured to the columnar support portions 66 by inserting the base portions 72 into the terminal attachment holes 69. In addition, as shown in FIG. 23 (B), a cut-out 70 is formed in the front bottom end portion of each columnar support portion 66 of the bobbin 64 for passing the spring portion 74 of the terminal 71 therethrough. The spring portion 74 and contact portion 75 pass through the cut-out 70 and protrude below the lower end face 66A of the columnar support portion 66. When mounting the magnetic sensor device 60 to the substrate 91, the contact portion 75 of each terminal 71 is disposed on a connection pad provided on the component-carrying surface 91A of the substrate 91 and the lower end face 66A of each columnar support portion 66 is brought into contact with the component-carrying surface 91A, at which time the contact portion 75 is pushed upward by the top face of the connection pad, the spring portion 74 is simultaneously resiliently deformed, and the contact portion 75 is displaced upward. Thus, the contact portion 75 is pressed against the top face of the connection pad by the resilient force of the spring portion 74.

As shown in FIG. 21, the yoke 77 comprises two yoke pieces 77A. Each yoke piece 77A is formed, for example, from iron or other soft magnetic material. A portion of one yoke piece 77A is disposed in front of the left-hand portion of the magnetic sensor 61, and another portion of the one yoke piece 77A is disposed above the left end portion of the magnetic sensor 61. In addition, a portion of the other yoke piece 77A is disposed in front of the right-hand portion of the magnetic sensor 61, and another portion of the other yoke piece 77A is disposed above the right end portion of the magnetic sensor 61.

The three magnetic sensors 61 are attached to the three sensor attachment portions 84 provided in the outer peripheral portion of the main body portion 82 of the sensor support member 81. In addition, the three yokes 77 are incorporated into the inner periphery of the main body portion 82. For example, the sensor support member 81 and the yokes 77 are integrally formed by insert molding. In addition, as shown in FIG. 19, in the main body portion 82, the three yokes 77 are respectively disposed in one-to-one correspondence with the three magnetic sensors 61. In the main body portion 82, one magnetic sensor 61 and one corresponding yoke 77 are disposed such that the positional relationship of the two is the positional relationship illustrated in FIG. 21.

The sensor support member 81 is a component used to support the three magnetic sensors 61 and three yokes 77 on the component-carrying surface 91A of the substrate 91. The sensor support member 81 is formed, for example, from plastic or other nonmagnetic material. As shown in FIGS. 17-20, the sensor support member 81 has a main body portion 82, three sensor attachment portions 84, three pairs of columnar support portions 86, and three securing portions 87.

The main body portion 82 has a predetermined three-dimensional shape extending in a first direction. In the present embodiment, the main body portion 82 is formed in a planar configuration expanding in the left-to-right and forward-backward directions which, as shown in FIG. 17, can cover a major part of the three magnetic sensors 61 from above and is also thick enough to be able to incorporate the three yokes 77 therein. It should be noted that in the present embodiment, the "first direction" is the left-to-right or forward-backward direction. In addition, as shown in FIG. 19, when the magnetic sensor device 60 is viewed from above, the main body portion 82 has a polygonal shape exhibiting three-fold symmetry (120-degree symmetry). Furthermore, a central hole 83 extending through the main body portion 82 in the up-down direction is formed at the center of the main body portion 82.

Figure 25:
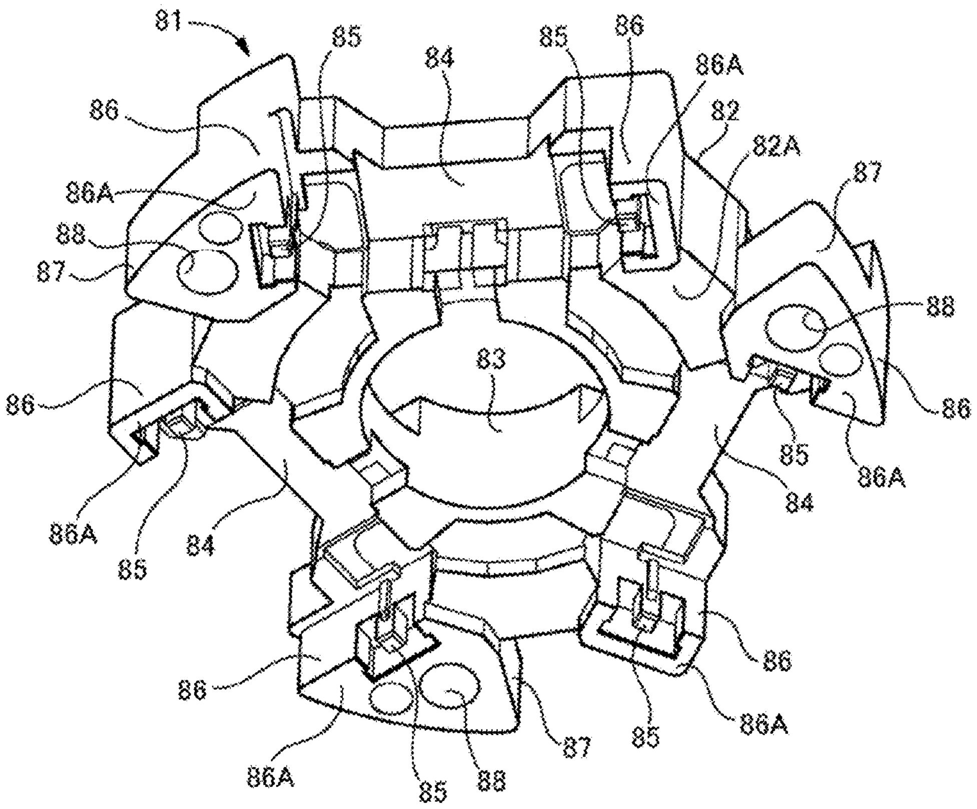
FIG. 25 is a perspective view of a sensor support member in the second embodiment of the inventive magnetic sensor device, as viewed obliquely from below.

The sensor attachment portions 84, which are sections used to attach the magnetic sensors 61 to the main body portion 82, are provided in the lower face 82A of the main body portion 82. FIG. 25 shows an oblique bottom view of the sensor support member 81. As shown in FIG. 25, the three sensor attachment portions 84 are provided in the lower face 82A of the main body portion 82 for attaching the three magnetic sensors 61 forming part of the magnetic sensor device 60. Each sensor attachment portion 84 is a recessed portion or cut-out provided in the outer peripheral portion of the lower face 82A of the main body portion 82. The three sensor attachment portions 84 are disposed at 120-degree intervals, equidistantly from the center of the main body portion 82, in the outer peripheral portion of the lower face 82A of the main body portion 82.

As shown in FIG. 18, each magnetic sensor 61 is inserted into and attached to a sensor attachment portion 84 from below the main body portion 82. Each magnetic sensor 61 is attached within a sensor attachment portion 84 such that the axis F of the bobbin 64 is parallel to the lower face 82A of the main body portion 82. In addition, as shown in FIG. 19, when the magnetic sensor device 60 is viewed from above, the three magnetic sensors 61 respectively attached to the three sensor attachment portions 84 are disposed at 120-degree intervals along a circle Q whose center coincides with the center C of the main body portion 82. Furthermore, when the magnetic sensor device 60 is viewed from above, each magnetic sensor 61 is disposed such that the central part of the magnetic wire rod 62 in the direction of extension is tangential to the circle Q.

In addition, as shown in FIG. 25, joining projections 85 are respectively provided at the two ends of each sensor attachment portion 84. Once a magnetic sensor 61 is inserted into a sensor attachment portion 84 from below the sensor attachment portion 84, the two joining projections 85 provided in the sensor attachment portion 84 are inserted into the respective joining holes 68 formed in the two joining portions 67 provided in the bobbin 64 of the magnetic sensor 61. In this state, the magnetic sensor 61 is secured within the sensor attachment portion 84 by joining each joining projection 85 and each joining portion 67 by heat swaging or similar means.

The six columnar support portions 86 are provided on the lower face 82A of the main body portion 82. Each columnar support portion 86 protrudes downwardly from the lower face 82A of the main body portion 82. As shown in FIG. 25, the six columnar support portions 86 are disposed on opposite sides of the three sensor attachment portions 84 so as to sandwich each of the three sensor attachment portions 84. In addition, the end face, that is, the lower end face 86A, on the protruding end of each columnar support portion 86 is a flat surface that is parallel to the lower face 82A of the main body portion 82. Once the magnetic sensor device 60 is mounted to the substrate 91, the lower end face 86A of each columnar support portion 86 makes contact with the component-carrying surface 91A of the substrate 91. In addition, the amount of downward protrusion of each columnar support portion 86 from the lower face 82A is configured such that, as shown in FIG. 18, the lower end face 86A of the columnar support portion 86 and the lower end face 66A of each columnar support portion 66 of the bobbin 64 of the magnetic sensor 61 attached to each sensor attachment portion 84 are aligned in the up-down direction.

Each securing portion 87 has the function of securing the sensor support member 81 to the substrate 91 using securing devices. As shown in FIG. 19, each securing portion 87 is provided in the outer peripheral portion of the main body portion 82. In addition, the three securing portions 87 are disposed on the outer periphery of the main body portion 82 at 120-degree intervals, for example. Furthermore, each securing portion 87 is disposed in the outer peripheral portion of the main body portion 82 between two adjacent sensor attachment portions 84. Moreover, each securing portion 87 protrudes downwardly from the main body portion 82 and the lower end face of each securing portion 87 is aligned in the up-down direction with the lower end faces 86A of the columnar support portions 86 as well as with the lower end face 66A of each columnar support portion 66 of the bobbin 64 of the magnetic sensor 61 attached to each sensor attachment portion 84. Once the magnetic sensor device 60 is mounted to the substrate 91, the lower end face of each securing portion 87 makes contact with the component-carrying surface 91A of the substrate 91. In addition, a securing hole 88 for inserting a securing device used to secure the sensor support member 81 to the substrate 91 is formed in each securing portion 87. The securing hole 88 extends through the securing portion 87 in the up-down direction.

Figure 26:
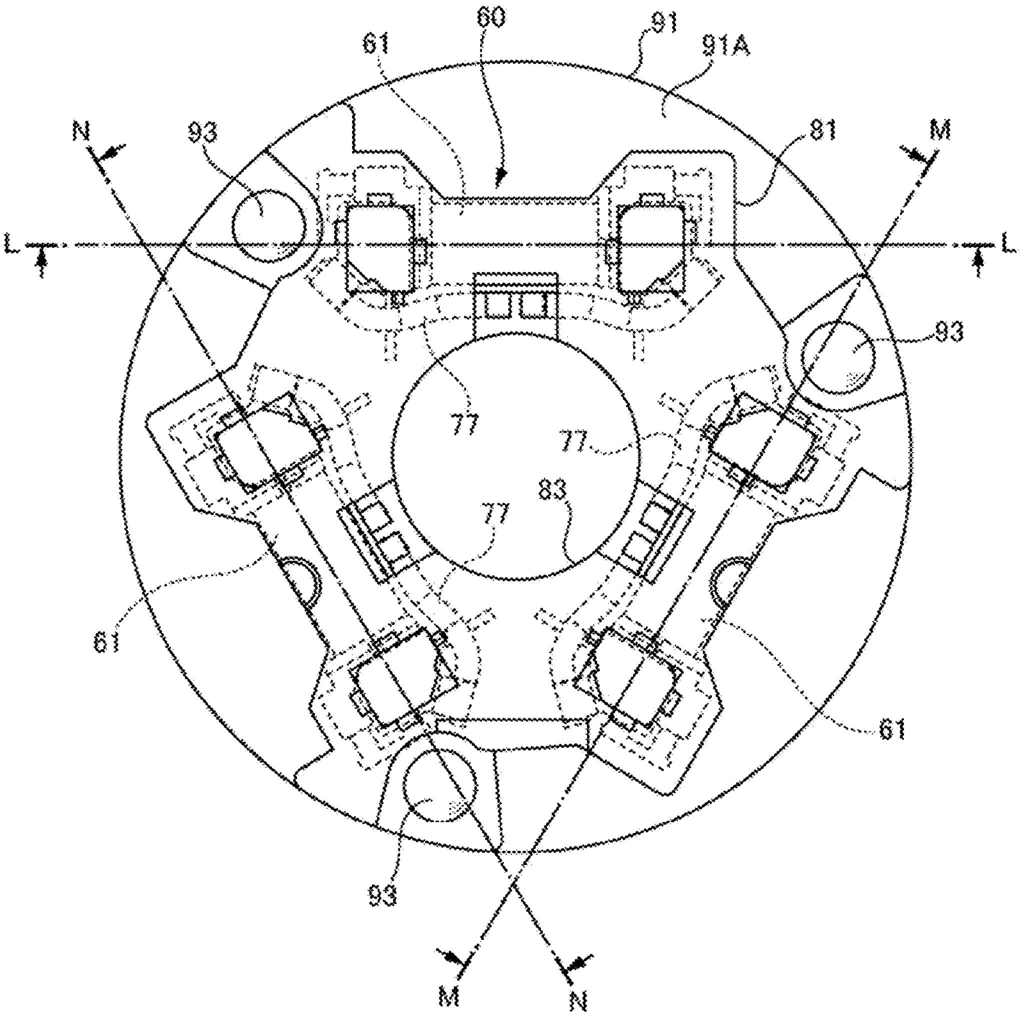
FIG. 26 is an illustrative view of the second embodiment of the inventive magnetic sensor device mounted to a substrate.

FIG. 26 shows a top view of the magnetic sensor device 60 mounted to the substrate 91. FIG. 27 diagrammatically shows a cross-section of the magnetic sensor device 60 and the substrate 91 taken along section line L-L in FIG. 26 as viewed from the bottom in FIG. 26. It should be noted that, when viewed from above, the construction of the magnetic sensor device 60 possesses three-fold symmetry and, therefore, the cross-section of the magnetic sensor device 60 taken along section line M-M in FIG. 26 as well as the cross-section of the magnetic sensor device 60 taken along section line N-N in FIG. 26 are both identical to the cross-section of the magnetic sensor device 60 taken along section line L-L in FIG. 26, that is, the cross-section of the magnetic sensor device 60 illustrated in FIG. 27.

As shown in FIGS. 26 and 27, when mounting the magnetic sensor device 60 to the substrate 91, the securing hole 88 of each securing portion 87 of the sensor support member 81 is aligned with a hole for securing the magnetic sensor device provided in the substrate 91 while the sensor support member 81 is disposed on the component-carrying surface 91A of the substrate 91. One securing device 93, e.g., a bolt or the like, is then inserted into the securing hole 88 and the hole for securing the magnetic sensor device, and another securing device 94, e.g., a nut or the like, is coupled (e.g., fastened) with the securing device 93. The sensor support member 81 is thus secured to the component-carrying surface 91A of the substrate 91.

Upon securing the sensor support member 81 to the substrate 91 in this manner, the lower end face 66A of each columnar support portion 66 of the bobbin 64 of each magnetic sensor 61, the lower end face 86A of each columnar support portion 86 of the sensor support member 81, as well as the lower end face of each securing portion 87 of the sensor support member 81, each make contact with the component-carrying surface 91A of the substrate 91. In addition, each terminal 71 of each magnetic sensor 61 makes contact with a connection pad provided on the component-carrying surface 91A. In addition, as shown in FIG. 27, the section on the outer peripheral surface of the coil 63 of each magnetic sensor 61 facing the component-carrying surface 91A and the component-carrying surface 91A itself are spaced apart from each other such that the distance J between the two exceeds the height dimension of the other components 92. Namely, a component placement space 89 allowing for placement of the other components 92 is formed between the section on the outer peripheral surface of the coil 63 of each magnetic sensor 61 facing the component-carrying surface 91A and the component-carrying surface 91A itself.

Figure 28:
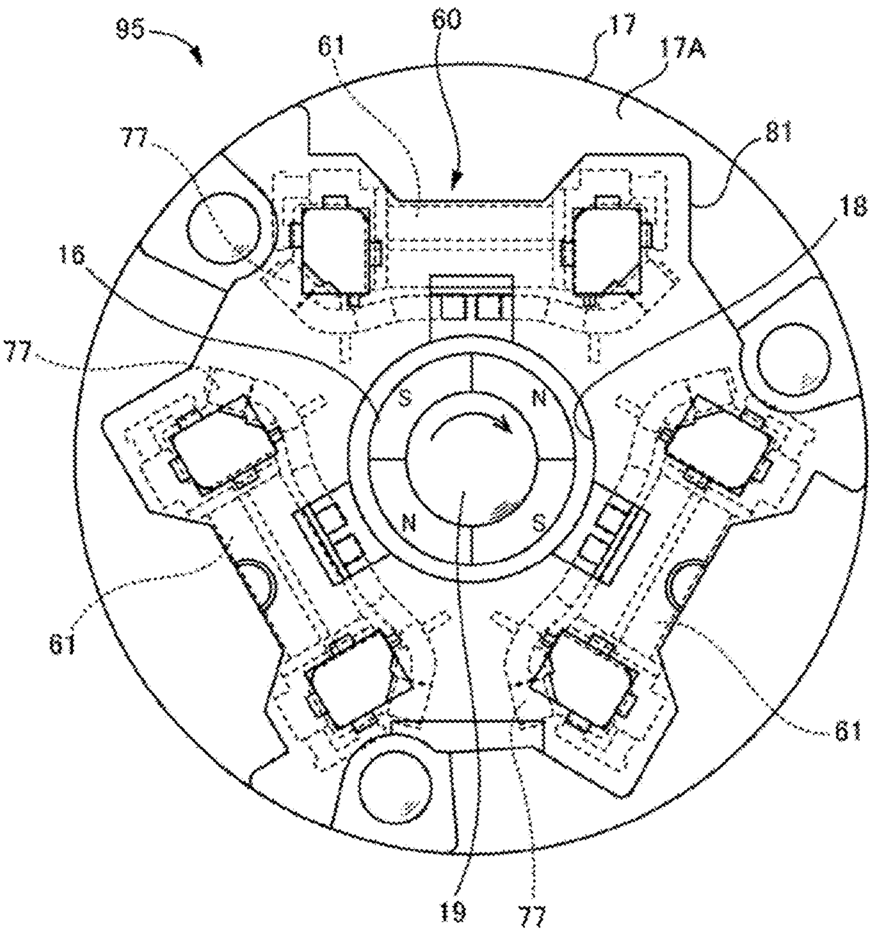
FIG. 28 is an illustrative view of a rotation sensing device as an example of the use of the second embodiment of the inventive magnetic sensor device.

In addition, as shown in FIG. 28, a rotation sensing device 95 configured similar to the rotation sensing device 55 illustrated in FIG. 15 can be formed using the magnetic sensor device 60. Due to the fact that each of the three magnetic sensors 61 and three yokes 77 is secured to the sensor support member 81 of the magnetic sensor device 60, the rotation sensing device 95 can be readily formed by positioning the support member 81 relative to the rotary shaft 19 or magnetic field forming member 16 while simultaneously placing and securing the sensor support member 81 onto the component-carrying surface 91A of the substrate 91. It should be noted that after positioning the support member 81 relative to the rotary shaft 19 or magnetic field forming member 16 while simultaneously placing the sensor support member 81 on the component-carrying surface 91A of the substrate 91, the central hole 83 of the sensor support member 81 and the insertion through-hole 18 formed in the substrate 17 coincide, and the rotary shaft 19 inserted into the insertion through-hole 18 as well as the magnetic field forming member 16 secured to the rotary shaft 19 are disposed within the central hole 83 of the sensor support member 81. The three yokes 77 and three magnetic sensors 61 are thus disposed on the outer periphery of the magnetic field forming member 16.

As discussed above, with the use of the magnetic sensor device 60 representing the second embodiment of the inventive magnetic sensor device, the other components 92 can be disposed in the areas where the component placement spaces 89 are formed on the component-carrying surface 91A of the substrate 91. In this manner, with the use of the magnetic sensor device 60, it is possible to increase the area where electrical and electronic components other than said magnetic sensor device 60 are disposed on the component-carrying surface 91A having the magnetic sensor device 60 disposed thereon.

It should be noted that although an example in which electrical and electronic components other than the magnetic sensor or magnetic sensor device are disposed in the component placement space has been given in each embodiment described above, components other than electrical and electronic components can also be disposed in the component placement space.

In addition, although surface mounting-type terminals have been cited as an example of the terminals of the magnetic sensor in the magnetic sensor embodiment as well as in the first embodiment of the magnetic sensor device described above, and compression terminals have been cited as an example of the terminals of the magnetic sensor in the second embodiment of the magnetic sensor device described above, the terminals of the magnetic sensor in the present invention may also be DIP-type terminals or press-fit type terminals.

In addition, although an example in which the three magnetic sensors 61 and three yokes 77 are disposed as shown in FIG. 19 in the main body portion 82 of the sensor support member 81 has been given in the second embodiment of the magnetic sensor device described above, it is possible to modify the number or location of the magnetic sensors and yokes disposed in the main body portion of the sensor support member depending on the intended use, etc., of the magnetic sensor device.

In addition, the present invention can be modified as appropriate where consistent with the essence or concept of the invention that can be read from the claims and the description in their entirety, and magnetic sensors, as well as magnetic sensor devices, featuring such modifications can also be included within the technical concept of the present invention.

DESCRIPTION OF THE REFERENCE NUMERALS

1, 61 Magnetic sensor
2, 62 Magnetic wire rod
3, 63 Coil
4, 64 Bobbin
5, 65 Wire winding portion
7, 66 Columnar support portion
7A, 66A Lower end face (end face on the protruding end)
8, 89 Component placement space
11, 51, 91 Substrate
11A, 51A, 91A Component-carrying surface
12, 52, 92 Other components (components)
30, 60 Magnetic sensor device
31 Magnetic sensor
32 Magnetic wire rod
33 Coil
34 Bobbin
36, 77 Yoke
41, 81 Sensor support member
42, 82 Main body portion
43, 84 Sensor attachment portion
44, 86 Columnar support portion
44A, 86A Lower end face (end face on the protruding end)
45 Component placement space
87 Securing portions
93, 94 Securing device

The invention claimed is:

1. A magnetic sensor that utilizes a Barkhausen effect, comprising:

a magnetic wire rod that generates a Barkhausen effect;

a coil through which flows an electric current corresponding to changes in a direction of magnetization of the magnetic wire rod; and a bobbin having a wire winding portion in whose interior the magnetic wire rod is disposed and on whose outer peripheral portion an electrical wire forming the coil is wound, and a pair of columnar support portions respectively provided in sections at opposite ends of the wire winding portion, wherein:

the pair of columnar support portions protrude from the respective sections at opposite ends of the wire winding portion in one direction, intersecting an axis of the wire winding portion, an end face on the protruding end of each columnar support portion is a surface that makes contact with a component-carrying surface once said magnetic sensor is mounted to a substrate, an amount of protrusion of the pair of columnar support portions from the sections at opposite ends of the wire winding portion in the one direction is configured such that, once said magnetic sensor is mounted to the substrate, a component placement space allowing for placement of components other than said magnetic sensor that are contemplated to be disposed on the component-carrying surface is formed between the section on the outer peripheral surface of the coil facing the component-carrying surface and the component-carrying surface itself, the amount of protrusion of the pair of columnar support portions is configured such that, once said magnetic sensor is mounted to the substrate, a distance between the section on the outer peripheral surface of the coil facing the component-carrying surface and the component-carrying surface itself exceeds a height dimension of the components, and the height dimension of the components is 1.3 mm or less, and the distance is 1.5 mm or more.

2. The magnetic sensor according to claim 1, wherein the amount of protrusion of the pair of columnar support portions is configured such that, once said magnetic sensor is mounted to the substrate, the distance between the section on the outer peripheral surface of the coil facing the component-carrying surface and the component-carrying surface itself becomes equal to or greater than a value obtained by adding an insulating distance to be ensured between the components and said magnetic sensor to the height dimension of the components.

3. The magnetic sensor according to claim 1, wherein the height dimension of the components is 0.8 mm to 1.3 mm, and the distance is 1.9 mm or more.

4. The magnetic sensor according to claim 1, further comprising a pair of terminals to which opposite ends of the electrical wire forming the coil are respectively connected, each terminal of the pair of terminals being attached to a rear portion of one of the sections at opposite ends of the wire winding portion or to a rear portion of one of the pair of columnar support portions.

5. The magnetic sensor according to claim 1, wherein a groove extending in a direction of the axis of the wire winding portion is formed in the wire winding portion, and the magnetic wire rod is disposed within the groove.

6. The magnetic sensor according to claim 1, wherein the end face on the protruding end of each columnar support portion of the pair of columnar support portions is a flat surface.

7. The magnetic sensor according to claim 1, wherein the magnetic wire rod is a composite magnetic wire formed from a semi-rigid magnetic material containing iron and cobalt, and has a diameter of 0.1 mm to 1 mm and a length of 10 mm to 30 mm.

8. The magnetic sensor according to claim 1, wherein the wire winding portion is formed in a cylindrical configuration, and the pair of columnar support portions protrude from the respective sections at opposite ends of the wire winding portion in a direction perpendicular to the axis of the wire winding portion.

9. A magnetic sensor device that utilizes a Barkhausen effect, comprising:

a plurality of magnetic sensors, each magnetic sensor having a magnetic wire rod that generates a large Barkhausen effect, a coil through which flows an electric current corresponding to changes in a direction of magnetization of the magnetic wire rod, and a bobbin in whose interior the magnetic wire rod is disposed and on whose outer peripheral portion an electrical wire forming the coil is wound;

a plurality of yokes that control the direction of magnetic flux of magnetic field acting on the magnetic sensors; and a sensor support member for supporting the magnetic sensors and the plurality of yokes on a component-carrying surface of a substrate, wherein:

the sensor support member has:

a main body portion having a predetermined three-dimensional shape extending in a first direction, a central hole being formed at a center of the main body portion and extending through the main body portion, and the plurality of yokes being incorporated into the main body portion;

a plurality of sensor attachment portions provided in the main body portion and used to attach the respective magnetic sensors to the main body portion in an orientation in which an axis of the bobbin of each magnetic sensor is parallel to a plane comprising the first direction; and a plurality of columnar support portions provided in the main body portion; and a plurality of securing portions for securing the sensor support member to the substrate using securing devices;

each columnar support portion protrudes from the main body portion in a second direction intersecting the plane comprising the first direction, an end face on the protruding end of each columnar support portion is a surface that makes contact with the component-carrying surface once said magnetic sensor device is mounted to the substrate, and an amount of protrusion of each columnar support portion from the main body portion in the second direction is configured such that, once said magnetic sensor device is mounted to the substrate, a component placement space allowing for placement of components other than said magnetic sensor device that are contemplated to be disposed on the component-carrying surface is formed between a section on the outer peripheral surface of the coil of a magnetic sensor attached to a corresponding sensor attachment portion which faces the component-carrying surface and the component-carrying surface itself.

10. The magnetic sensor device according to claim 9, wherein the amount of protrusion of each columnar support portion is configured such that, once said magnetic sensor device is mounted to the substrate, the distance between the section on the outer peripheral surface of the coil of a magnetic sensor attached to a corresponding sensor attachment portion which faces the component-carrying surface and the component-carrying surface itself exceeds a height dimension of the components.

11. The magnetic sensor device according to claim 9, wherein the amount of protrusion of each columnar support portion is configured such that, once said magnetic sensor device is mounted to the substrate, the distance between the section on the outer peripheral surface of the coil of a magnetic sensor attached to a corresponding sensor attachment portion which faces the component-carrying surface and the component-carrying surface itself becomes equal to or greater than a value obtained by adding an insulating distance to be ensured between the components and the magnetic sensor to a height dimension of the components.

12. The magnetic sensor device according to claim 9, wherein each of the plurality of securing portions is disposed in an outer peripheral portion of the main body portion between two adjacent sensor attachment portions, and a securing hole for inserting a securing device used to secure the sensor support member to the substrate is formed in each of the plurality of securing portions.

13. The magnetic sensor device according to claim 9, wherein each of the plurality of yokes comprises two yoke pieces, and the plurality of yokes are respectively disposed in one-to-one correspondence with the plurality of magnetic sensors.

14. The magnetic sensor device according to claim 9 wherein the plurality of magnetic sensors comprises three magnetic sensors, and the plurality of sensor attachment portions comprises three sensor attachment portions disposed at 120-degree intervals equidistantly from the center of the main body portion, such that the three magnetic sensors are disposed at 120-degree intervals along a circle whose center coincides with the center of the main body portion.

15. The magnetic sensor device according to claim 9, wherein each magnetic sensor of the plurality of magnetic sensors further comprises a pair of terminals, each terminal being a compression terminal having a base portion, an electrical wire connecting portion to which one end of the electrical wire forming the coil is connected, a spring portion serving as a flat spring, and a contact portion provided at a protruding end of the spring portion and configured to make contact with a connection pad provided on the component-carrying surface of the substrate.

16. The magnetic sensor device according to claim 9, wherein the bobbin of each magnetic sensor has two joining portions each formed with a joining hole, and each sensor attachment portion is provided with joining projections that are inserted into the respective joining holes to secure the magnetic sensor within the sensor attachment portion.

17. The magnetic sensor device according to claim 9, wherein the main body portion has a polygonal shape exhibiting three-fold symmetry when viewed in the second direction.

18. The magnetic sensor device according to claim 9, wherein each sensor attachment portion is a recessed portion or cut-out provided in an outer peripheral portion of a lower face of the main body portion, and each magnetic sensor is inserted into and attached to the sensor attachment portion from below the main body portion such that the axis of the bobbin is parallel to the lower face of the main body portion.

19. The magnetic sensor device according to claim 9, wherein the plurality of columnar support portions comprises six columnar support portions disposed on opposite sides of the sensor attachment portions so as to sandwich each of the sensor attachment portions, and the end face on the protruding end of each of the six columnar support portions is a flat surface parallel to a lower face of the main body portion.

20. The magnetic sensor device according to claim 9, wherein each of the plurality of yokes is formed from a soft magnetic material and is incorporated into an inner periphery of the main body portion, and the sensor support member and the plurality of yokes are integrally formed by insert molding.

* * * * *